US008850255B2

(12) United States Patent
Nakashima et al.

(10) Patent No.: US 8,850,255 B2
(45) Date of Patent: Sep. 30, 2014

(54) STORAGE SYSTEM CONTROL APPARATUS AND CONTROL METHOD FOR UTILIZING A RELAY UNIT OF AN ABNORMAL CONTROL UNIT

(75) Inventors: Kazuo Nakashima, Kawasaki (JP); Ryohei Nishimiya, Kawasaki (JP); Fumio Hanzawa, Kawasaki (JP); Masanori Ito, Kawasaki (JP); Kazuhiro Hara, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 566 days.

(21) Appl. No.: 13/188,833

(22) Filed: Jul. 22, 2011

(65) Prior Publication Data

US 2012/0036387 A1    Feb. 9, 2012

(30) Foreign Application Priority Data

Aug. 4, 2010    (JP) ................. 2010-175527

(51) Int. Cl.
G06F 1/00   (2006.01)
G06F 1/32   (2006.01)
G06F 11/07  (2006.01)
G06F 11/20  (2006.01)

(52) U.S. Cl.
CPC .......... *G06F 11/2089* (2013.01); *G06F 11/201* (2013.01); *G06F 11/2092* (2013.01); *G06F 11/0757* (2013.01); *G06F 11/0727* (2013.01)
USPC ......................................... 713/340; 713/324

(58) Field of Classification Search
CPC .................................... G06F 9/00; G06F 1/26
USPC .............................................. 713/340, 324
See application file for complete search history.

(56) References Cited

U.S. PATENT DOCUMENTS 7,251,701 B2    7/2007  Chikusa et al.
7,900,083 B2    3/2011  Tanaka et al.
(Continued)

FOREIGN PATENT DOCUMENTS

JP    2000-148655 A    5/2000
JP    2000-172624 A    6/2000
(Continued)

OTHER PUBLICATIONS

Japanese Office Action mailed Jan. 28, 2014 for corresponding Japanese Application No. 2010-175527, with Partial English-language Translation.

*Primary Examiner* — Thomas Lee
*Assistant Examiner* — Phil Nguyen
(74) *Attorney, Agent, or Firm* — Fujitsu Patent Center

(57) ABSTRACT

A storage system includes a storage and control units. In each of the control units: a relay unit relays access to the storage; an access controller accesses the storage through one of the relay unit in the control unit and the relay unit in another of the control units; and an operational-state controller determines whether or not the relay unit in the above-mentioned another control unit is usable when the operational-state controller detects occurrence of an abnormality in the above-mentioned another control unit, and makes the above-mentioned another control unit transition to a partially-operational state when the relay unit in the above-mentioned another control unit is usable. In the partially-operational state, at least the access controller in the above-mentioned another control unit is not in operation and the access controller in the control unit can access the storage through the relay unit in the above-mentioned another control unit.

14 Claims, 22 Drawing Sheets

(56) References Cited

U.S. PATENT DOCUMENTS

| | | |
|---|---|---|
| 7,917,664 B2 * | 3/2011 | Honjo et al. .................... 710/15 |
| 8,051,325 B2 * | 11/2011 | Kitano ............................ 714/12 |
| 2001/0000700 A1 * | 5/2001 | Eslambolchi et al. ........ 370/217 |
| 2006/0117159 A1 | 6/2006 | Ohara et al. |
| 2006/0215682 A1 * | 9/2006 | Chikusa et al. ............... 370/428 |
| 2006/0288164 A1 * | 12/2006 | Kano et al. .................... 711/114 |
| 2007/0250723 A1 * | 10/2007 | Shima et al. .................. 713/300 |
| 2008/0133942 A1 * | 6/2008 | Ogasawara et al. ........... 713/300 |
| 2008/0141054 A1 * | 6/2008 | Danilak ......................... 713/340 |
| 2011/0191537 A1 * | 8/2011 | Kawaguchi et al. .......... 711/114 |

FOREIGN PATENT DOCUMENTS

| | | |
|---|---|---|
| JP | 2004-252692 A | 9/2004 |
| JP | 2006-72636 A | 3/2006 |
| JP | 2006-155392 A | 6/2006 |
| JP | 2007-272702 A | 10/2007 |
| JP | 2009-157859 A | 7/2009 |
| JP | 2009-205316 A | 9/2009 |

* cited by examiner

FIG. 14A  When Other CM is in "P_State3", TB1

| CT2 / CT1 | 0~99 | 100~199 | 200~255 |
|---|---|---|---|
| 0~99 | 50/50 | 70/30 | 100/STB |
| 100~199 | 30/70 | 50/50 | 100/STB |
| 200~255 | STB/100 | STB/100 | 50/50 |

FIG. 14B  When Other CM is in "P_State2", TB2

| CT2 / CT1 | 0~99 | 100~199 | 200~255 |
|---|---|---|---|
| 0~99 | 60/40 | 80/20 | 100/STB |
| 100~199 | 40/60 | 60/40 | 100/STB |
| 200~255 | STB/100 | STB/100 | 60/40 |

STORAGE SYSTEM CONTROL APPARATUS AND CONTROL METHOD FOR UTILIZING A RELAY UNIT OF AN ABNORMAL CONTROL UNIT

CROSS-REFERENCE TO RELATED APPLICATION

This application is based upon and claims the benefits of priority of the prior Japanese Patent Application No. 2010-175527, filed on Aug. 4, 2010, the entire contents of which are incorporated herein by reference.

FIELD

The embodiments discussed herein relate to a storage system, a control apparatus, and a control method.

BACKGROUND

Currently, storage systems each using more than one large-capacity storage device such as more than one HDD (hard disk drive) are widely used. Generally, the storage systems each contain a plurality of storage devices and a control device which controls access to the plurality of storage devices. In some storage systems, the access paths to the plurality of storage devices are redundantly provided by arranging a plurality of control devices in each storage system. The redundancy of the access paths improves the reliability of the access to the storage devices.

Further, redundancy can be realized in the access path between each control device and a storage device by arranging a first access path directly connecting each control device and the storage device and a second access path connecting each control device and the storage device through another control device. For example, in the case where each control device contains an SAS expander which relays access to a storage device, each control device may be arranged to be able to access the storage device by using either of a first access path to the storage device through the SAS expander arranged in the control device and a second access path to the storage device through an SAS expander arranged in another control device. (SAS stands for Serial Attached SCSI, and SCSI stands for Small Computer System Interface.)

In a known example of a storage system in which control devices are redundantly arranged, a router is arranged between a plurality of storage devices and a disk adapter provided in each control device, and the storage system is configured to enable communication by selectively switching the disk adapter and the storage device. Further, in another known example of a storage system in which a plurality of control devices access a storage device through a plurality of external SAS expanders, each control device and each SAS expander have a plurality of physical ports and correspond to one of two port groups, and the control devices, the SAS expanders, and the storage device are connected by appropriately combining the physical ports so as to realize the redundancy. (See, for example, Japanese Laid-open Patent Publications Nos. 2006-155392 and 2006-72636.)

As mentioned before, in the storage systems in which a plurality of control devices are arranged, and a first access path directly connecting each control device and the storage device and a second access path connecting each control device and the storage device through another control device are arranged, it is possible to make the access path to the storage device redundant, and the redundancy of the access path improves the reliability of the access to the storage device. However, when a control device in the second access path fails, the second access path becomes unusable, so that the redundancy of the access path is lost. When the redundancy of the access path is lost, the access reliability is lowered, and access to the storage device is concentrated in the first access path, so that the performance of the access to the storage device is lowered.

SUMMARY

According to an aspect of the present invention, a storage system is provided. The storage system includes a storage device which stores data; and a plurality of control units which control operations for accessing the storage device. Each of the plurality of control units includes: a relay unit which relays access to the storage device; an access controller which accesses the storage device through one of the relay unit belonging to the control unit and the relay unit belonging to another of the plurality of control units; and an operational-state controller which determines whether or not the relay unit belonging to the above-mentioned another control unit is usable when the operational-state controller detects occurrence of an abnormality in the above-mentioned another control unit, and makes the above-mentioned another control unit transition to a partially-operational state when the relay unit belonging to the above-mentioned another control unit is usable, where the partially-operational state of the above-mentioned another control unit is a state in which a portion of the above-mentioned another control unit including at least the access controller in the above-mentioned another control unit is not in operation and the access controller in the control unit can access the storage device through the relay unit in the above-mentioned another control unit.

According to the storage system, the control apparatus, and the control method which are disclosed in this specification, it is possible to suppress lowering of the reliability of access from each control apparatus to a storage device even when an abnormality occurs in another control apparatus.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWINGS

FIGS. 14A and 14B are examples of tables which are referred to when an I/O access controller according to a fourth embodiment selects an access path;

DESCRIPTION OF EMBODIMENTS

The embodiments will be explained below with reference to the accompanying drawings, wherein like reference numbers refer to like elements throughout.

1. First Embodiment

Figure 1:
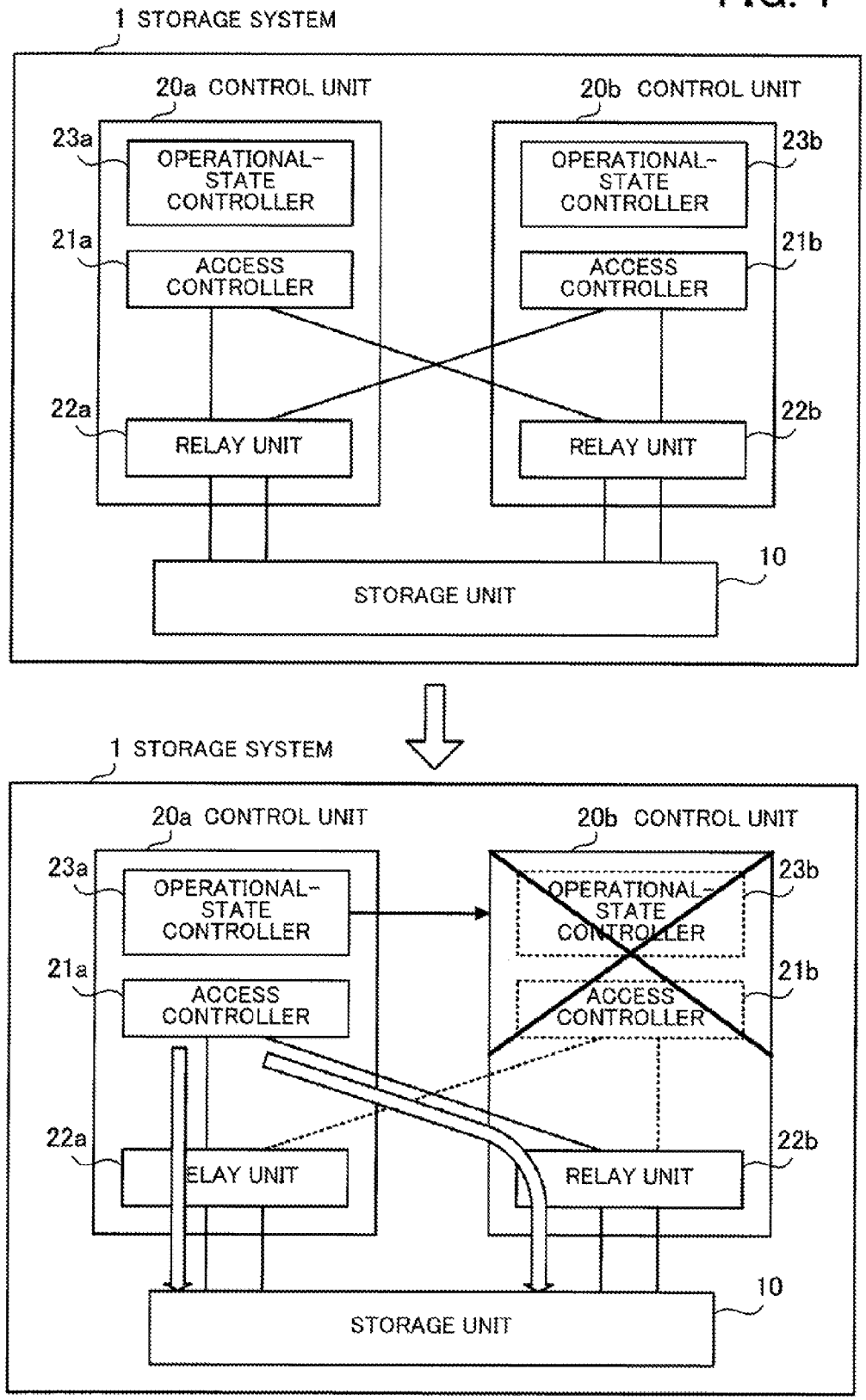
FIG. 1 illustrates an example of a construction of a storage system according to a first embodiment.

FIG. 1 illustrates an example of a construction of the storage system according to the first embodiment. The storage system illustrated in FIG. 1 comprises a storage device 10 and control units 20a and 20b. Although the storage system illustrated in FIG. 1 includes only two control units 20a and 20b, generally the storage system 1 may have more than two control units.

The storage unit 10 is a unit for storing data, and contains a plurality of storage devices such as a plurality of HDDs (hard disk drives). The control units 20a and 20b control the processing for accessing the storage unit 10. For example, when the control units 20a and 20b receive an access request for the storage unit 10 from a host apparatus (not shown), the control units 20a and 20b access the storage unit 10 in response to the access request.

For example, when each of the control units 20a and 20b receives from the host apparatus a request for reading out data stored in the storage unit 10, the control unit reads out the data from the storage unit 10, and transmits the data to the host apparatus. When each of the control units 20a and 20b receives from the host apparatus a request for writing data in the storage unit 10, the control unit writes the data in the storage unit 10. Further, each of the control units 20a and 20b may have a function of caching data stored in the storage unit 10.

Each control unit in the storage system 1 has an identical construction. The control unit 20a comprises an access controller 21a, a relay unit 22a, and an operational-state controller 23a, and the control unit 20b comprises an access controller 21b, a relay unit 22b, and an operational-state controller 23b. In the control units 20a and 20b, the unit or controller having an identical name can execute identical processing.

The access controller in each control unit accesses the storage unit 10 through the relay unit which is arranged in the control unit or the other control unit. The relay unit in each control unit relays access to the storage unit 10 from the access controller arranged in the control unit or the other control unit. That is, in the example of FIG. 1, the access controller 21a can access the storage unit 10 through either the relay unit 22a or the relay unit 22b, and the access controller 21b can access the storage unit 10 through either the relay unit 22b or the relay unit 22a. Thus, the access path from the access controller 21a to the storage unit 10 and the access path from the access controller 21b to the storage unit 10 are redundantly arranged, so that the reliability of the access to the storage unit 10 is improved.

The operational-state controller in each control unit has a function of controlling the operational state of the other control unit according to the position of an abnormality in the other control unit when occurrence of the abnormality in the other control unit is detected. Specifically, when one of the control units 20a and 20b is in a normal operational state, and the operational-state controller in the control unit in the normal operational state detects occurrence of an abnormality in the other control unit, the control unit in the normal operational state determines whether or not the relay unit in the other control unit is usable. When the relay unit in the other control unit is determined to be usable, the control unit in the normal operational state makes the other control unit transition to a partially-operational state. When the other control unit transitions to the partially-operational state, at least the access controller in the other control unit is stopped while the accessibility to the storage unit through the relay unit in the other control unit from the access controller to which the operational-state controller belongs is maintained.

The upper half of FIG. 1 indicates the case where the both of the control units 20a and 20b are in the normal operational state. When an abnormality occurs in the control unit 20b in the situation indicated in the upper half of FIG. 1, the operational-state controller 23a in the control unit 20a detects the occurrence of the abnormality in the control unit 20b, and determines whether or not the relay unit 22b in the control unit 20b is usable. When the relay unit 22b is determined to be usable, the operational-state controller 23a makes the control unit 20b transition to a partially-operational state as indicated in the lower half of FIG. 1. In the control unit 20b in the partially-operational state, at least the access controller 21b is not in operation while the accessibility from the access controller 21a to the storage unit 10 through the relay unit 22b is maintained. In addition, the operational-state controller 23b in the control unit 20b may not be in operation. Further, when the control unit 20b is in the partially-operational state, the power supply to the access controller 21b and the operational-state controller 23b may be stopped.

When the control unit 20b is in the partially-operational state, the relay unit 22b in the control unit 20b can be used by the control unit 20a although the control unit 20b cannot access the storage unit 10. Therefore, the access controller 21a in the control unit 20a can access the storage unit 10 through the relay unit 22b in the control unit 20b as well as through the relay unit 22a. Thus, after the state of the control unit 20b transitions to the partially-operational state when an abnormality occurs in the control unit 20b, it is possible to maintain the redundancy of the access path from the access controller 21a in the control unit 20a to the storage unit 10, and therefore maintain the reliability of the access from the access controller 21a to the storage unit 10. In addition, it is possible to avoid concentration, in the access path passing through the relay unit 22a, of the data transferred between the access controller 21a and the storage unit 10, and therefore maintain the performance in the access from the control unit 20a to the storage unit 10.

Further, the operational-state controller 23b in the control unit 20b can also perform processing similar to the operational-state controller 23a in the control unit 20a. Specifically, when the operational-state controller 23b detects occurrence of an abnormality in the control unit 20a, the operational-state controller 23b determines whether or not the relay unit 22a in the control unit 20a is usable. When the relay unit 22a is determined to be usable, the operational-state controller 23b makes the control unit 20a transition to a partially-operational state while the accessibility from the access controller 21b to the storage unit 10 through the relay unit 22a in the control unit 20a is maintained. Thus, even when an abnormality occurs in the control unit 20a, it is possible to maintain the redundancy of the access path from the access controller 21b in the control unit 20b to the storage unit 10, and therefore maintain the reliability of the access from the access controller 21b to the storage unit 10.

2. Second Embodiment

2.1 Configuration of Storage System

Figure 2:
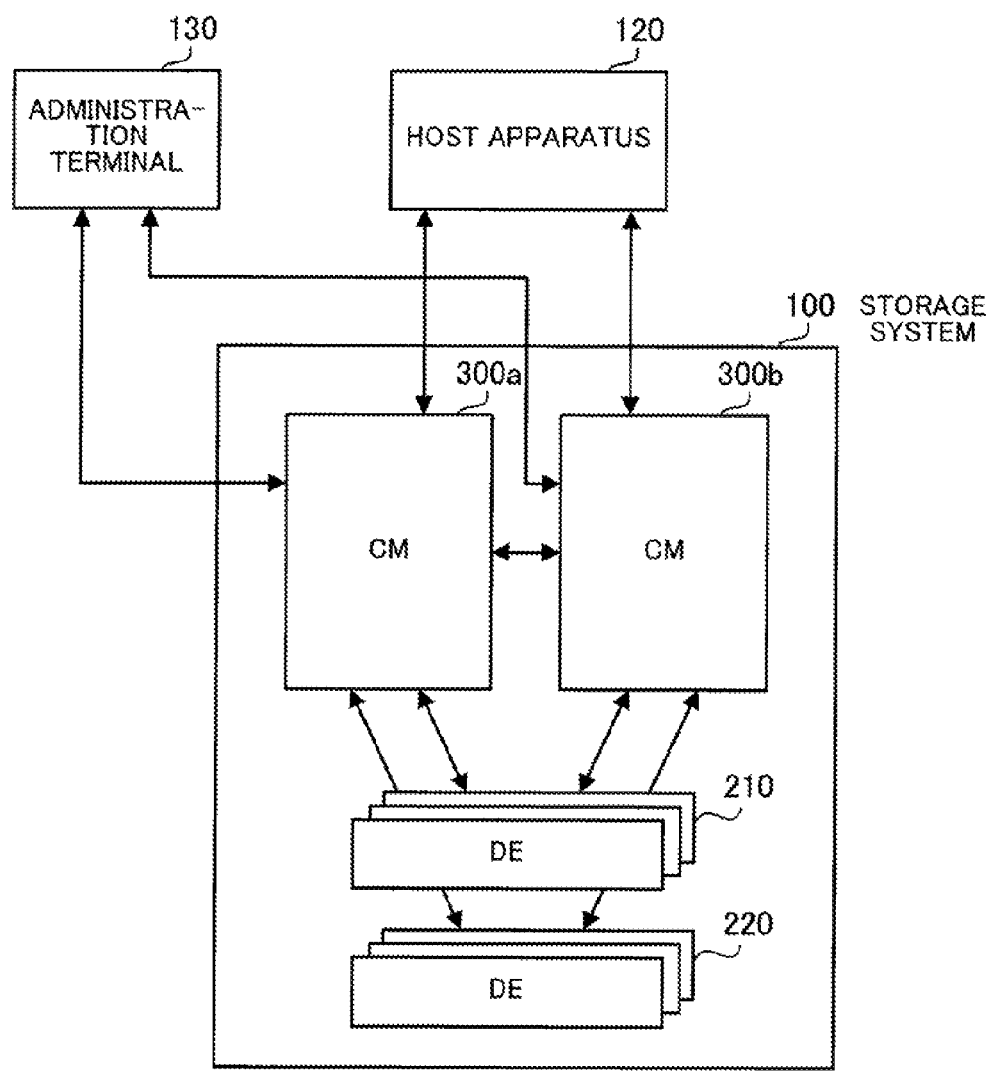
FIG. 2 illustrates an entire configuration of a storage system according to a second embodiment.

FIG. 2 illustrates an entire configuration of an example of a construction of a storage system according to the second embodiment. The storage system according to the second embodiment is an example of a storage system using SAS expanders as relay units which relay access to a storage unit.

The storage system 100 illustrated in FIG. 2 comprises drive enclosures (DEs) 210 and 220 and control modules (CMs) 300a and 300b. Each of the DEs 210 and 220 contains a plurality of HDDs as storage devices. The CMs 300a and 300b control access to the HDDs in the DEs 210 and 220. Alternatively, the DEs 210 and 220 may be arranged outside the storage system 100, and may be various other types of storage devices (e.g., solid-state devices (SSDs)).

A host apparatus 120 and an administration terminal 130 are connected to the storage system 100. The host apparatus 120 requests the CM 300a or 300b in the storage system 100 for access to one or more HDDs in the DE 210 or 220. Each of the CMs 300a and 300b is connected to the host apparatus 120 through, for example, an optical fiber. The administration terminal 130 manages the operation of the storage system 100 according to an administrator's manipulation. For example, the administration terminal 130 can request for power-on or power-off of each of the CMs 300a and 300b according to the administrator's manipulation. The administration terminal 130 and the CMs 300a and 300b are connected, for example, through LAN (Local Area Network) cables.

Each of the CMs 300a and 300b controls access to the HDDs in the DEs 210 and 220 according to access requests from the host apparatus 120. For example, when each of the CMs 300a and 300b receives from the host apparatus 120 a request for reading out data stored in the HDDs, the CM reads out the data from the HDDs, and transmits the data to the host apparatus 120. When each of the CMs 300a and 300b receives from the host apparatus 120 a request for writing data in the HDDs, the CM writes the data in the HDDs.

Further, each of the CMs 300a and 300b has a function of caching data stored in the HDDs in the DEs 210 and 220. In addition, data can be transmitted between the CMs 300a and 300b. For example, each of the CMs 300a and 300b stores a backup of data cached in the other of the CMs 300a and 300b. Further, each of the CMs 300a and 300b can control the power-supply state of the other of the CMs 300a and 300b. Furthermore, the CMs 300a and 300b may manage the data stored in the HDDs, for example, by using the RAID (Redundant Arrays of Inexpensive Disks) technique.

2.2 Hardware Construction of Controller Modules

Figure 3:
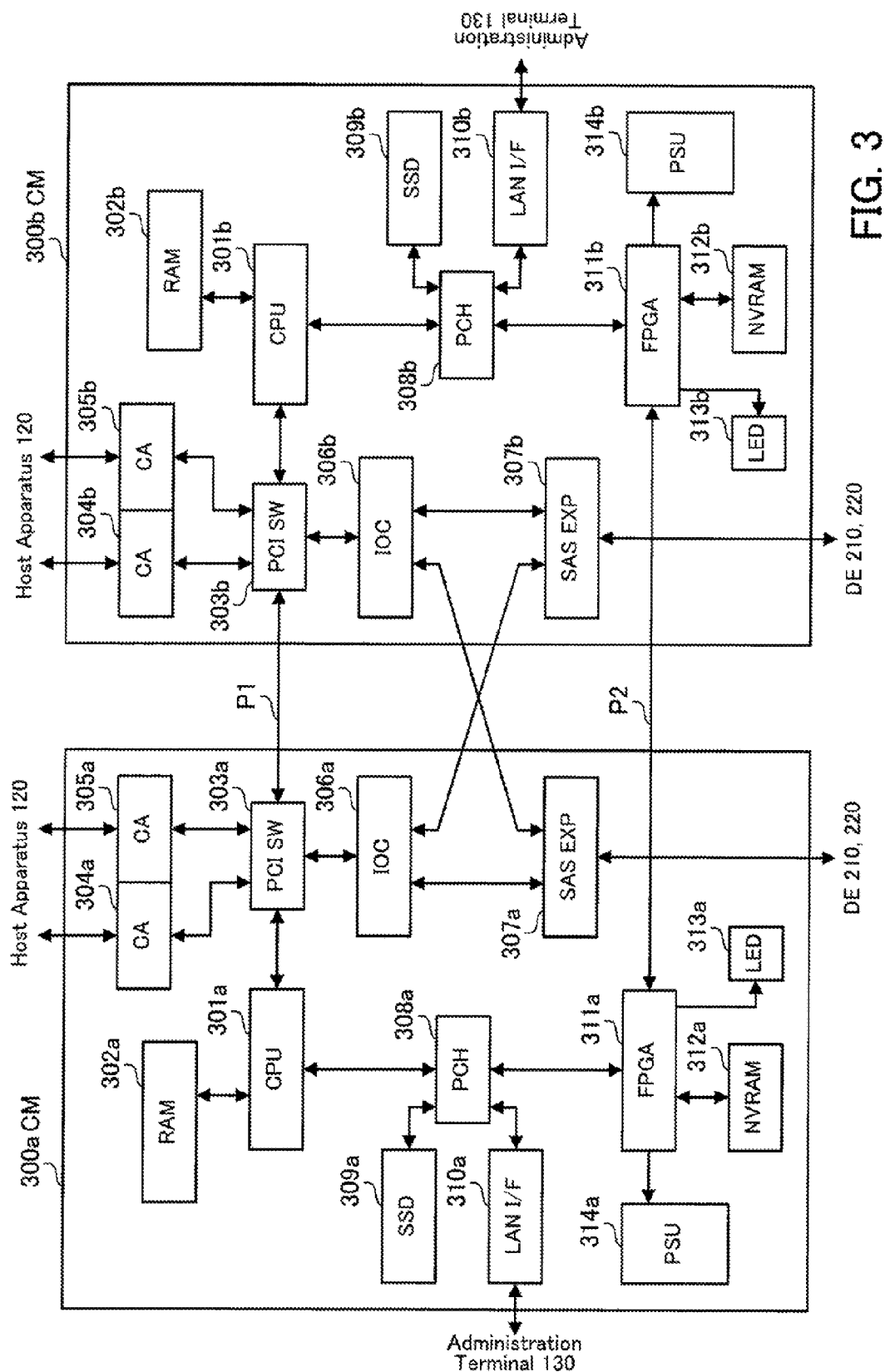
FIG. 3 illustrates an example of a hardware construction of controller modules (CMs) in the storage system according to the second embodiment.

FIG. 3 illustrates an example of a hardware construction of the controller modules (CMs) in the storage system according to the second embodiment. The CM 300a comprises a CPU (Central Processing Unit) 301a, an RAM (Random Access Memory) 302a, a PCI (Peripheral Component Interconnect) switch 303a, channel adapters (CAs) 304a and 305a, an In/Out controller (IOC) 306a, an SAS expander 307a, a platform controller hub (PCH) 308a, a solid-state device (SSD) 309a, an LAN interface 310a, an FPGA (Field Programmable Gate Array) 311a, a nonvolatile RAM (NVRAM) 312a, an LED (light emitting diode) unit 313a, and a power supply unit (PSU) 314a. As illustrated in FIG. 3, the CM 300b has the same hardware construction as the CM 300a. That is, the CM 300b comprises a CPU (Central Processing Unit) 301b, an RAM (Random Access Memory) 302b, a PCI (Peripheral Component Interconnect) switch 303b, channel adapters (CAs) 304b and 305b, an In/Out controller (IOC) 306b, an SAS expander 307b, a platform controller hub (PCH) 308b, a solid-state device (SSD) 309b, an LAN interface 310b, an FPGA (Field Programmable Gate Array) 311b, a nonvolatile RAM (NVRAM) 312b, an LED (light emitting diode) unit 313b, and a power supply unit (PSU) 314b. Therefore, explanations on the hardware construction of only the CM 300a are not presented below.

The CPU 301a controls the entire CM 300a in a centralized manner. The RAM 302a is used as the main storage device of the CM 300a, and temporarily stores at least portions of programs which are executed by the CPU 301, as well as various types of data necessary for processing performed by the CPU 301a. In addition, the RAM 302a is also used as cache areas for the data stored in the HDDs in the DEs 210 and 220.

Data are transmitted between the CPU 301a and either of the CA 304a, the CA 305a, and the IOC 306a through the PCI switch 303a. In addition, the PCI switch 303a in the CM 300a is connected to the PCI switch 303b in the CM 300b. (Hereinafter, the communication path between the PCI switches 303a and 303b is referred to as the communication path P1.) Thus, the CPU 301a in the CM 300a and the CPU 301b in the CM 300b can communicate with each other through the communication path P1. For example, the CPU 301a in the CM 300a can acquire abnormality-detection information indicating details of an abnormality occurring in the other CM 300b, from the CPU 301b in the other CM 300b through the communication path P1. In addition, the CPU 301a or 301b in the CM 300a or 300b can transmit the data cached in the RAM 302a or 302b in the CM 300a or 300b, to the opposite CPU 301b or 301a in the other CM 300b or 300a, and request the other CM 300b or 300a to back up the transmitted data in the RAM 302b or 302a in the other CM 300b or 300a.

The CAs 304a and 305a perform interface processing for data transmission between the host apparatus 120 and the CM 300a. In the case where the CAs 304a and 306a are respectively connected to the host apparatus 120 through individual optical fiber cables, the communication path between the CM 300a and the host apparatus 120 becomes redundant, so that the reliability of the communication can be improved.

The IOC 306a is a control circuit (specifically, an SAS controller) which executes interface processing between the HDDs in the DEs 210 and 220 (as SAS devices) and non-SAS devices. The SAS expander 307a relays data between the IOC 306a and the SAS devices. The SAS expander 307a contains a memory, and stores in the memory information indicating the power-supply state of the CM 300a.

The IOC 306a in the CM 300a is connected to the DEs 210 and 220 through the SAS expander 307a in the CM 300a. In addition, the IOC 306a in the CM 300a is also connected to the DEs 210 and 220 through the SAS expander 307b in the CM 300b. Thus, the IOC 306a in the CM 300a is connected to the DEs 210 and 220 through either of the SAS expanders 307a and 307b. In other words, the access path from the IOC 306a to the DEs 210 and 220 is redundantly arranged.

Similarly, the IOC 306b in the CM 300b is connected to the DEs 210 and 220 through the SAS expander 307b in the CM 300b. In addition, the IOC 306b in the CM 300b is also connected to the DEs 210 and 220 through the SAS expander 307a in the CM 300a. Thus, the IOC 306b in the CM 300b is connected to the DEs 210 and 220 through either of the SAS expanders 307b and 307a. In other words, the access path from the IOC 306b to the DEs 210 and 220 is redundantly arranged.

In the following explanations, the path for accessing the DEs 210 and 220 from the IOC 306a through the SAS expander 307a and the path for accessing the DEs 210 and 220 from the IOC 306b through the SAS expander 307b are each referred to as a straight path, and the path for accessing the DEs 210 and 220 from the IOC 306a through the SAS expander 307b and the path for accessing the DEs 210 and 220 from the IOC 306b through the SAS expander 307a are each referred to as a cross path.

The PCH 308a relays data transmitted between the CPU 301a and either of the SSD 309a, the LAN interface 310a, and the FPGA 311a. The SSD 309a is used as a secondary storage device in the CM 300a, and stores the programs executed by the CPU 301, the various types of data necessary for execution of the programs by the CPU 301a, and other data. Alternatively, another type of nonvolatile storage device such as an HDD may be used as the secondary storage device.

The LAN interface 310a is provided for transmission and reception of data to and from the administration terminal 130, and is connected to the administration terminal 130 through a LAN cable.

The FPGA 311a has a function of monitoring the condition of the hardware of the CM 300a. When the FPGA 311a detects an abnormality in the hardware of the CM 300a, the FPGA 311a sends abnormality-detection information to the CPU 301a, where the abnormality-detection information indicates details of the abnormality occurring in the hardware of the CM 300a. In addition, the FPGA 311a stores the abnormality-detection information in the NVRAM 312a. Further, when the CPU 301a detects an abnormality during program execution, the FPGA 311a receives from the CPU 301a abnormality-detection information indicating details of the detected abnormality, and stores the received abnormality-detection information in the NVRAM 312a. Furthermore, the FPGA 311a can transmit the abnormality-detection information stored in the NVRAM 312a, to the FPGA 311b in the CM 300b in response to a request received from the CPU 301a or the FPGA 311b. Moreover, the FPGA 311a has a function of controlling the power-supply state of the CM 300a and a function of communicating with the FPGA 311b in the CM 300b. Specifically, the FPGA 311a controls the PSU 314a so as to make the power-supply state of the CM 300a transition to a predetermined state, in response to a request received from the CPU 301a or the FPGA 311b in the CM 300b. In addition, for example, in response to a request received from the CPU 301a, the FPGA 311a sends to the FPGA 311b in the CM 300b through the communication path connecting the FPGAs 311a and 311b a request to make the power-supply state of the CM 300b transition to a predetermined state. Hereinafter, the communication path connecting the FPGAs 311a and 311b is referred to as the communication path P2. Alternatively, the above operations performed by the FPGA 311a may be performed by using another type of control circuit such as a microcomputer.

The NVRAM 312a is a nonvolatile memory which stores various types of data necessary for processing by the FPGA 311a. As mentioned before, the abnormality-detection information indicating details of the detected abnormality and being detected by the CM 300a is stored in the NVRAM 312a by the FPGA 311a.

The LED unit 313a is a means for indicating occurrence of an abnormality in the CM 300a. The turn-on and turn-off operations of the LED unit 313a are controlled by the FPGA 311a. As explained later, there are two types of power-supply states of the CM 300a when an abnormality occurs in the CM 300a. The LED unit 313a indicates the two types of power-supply states in distinction from each other under control of the FPGA 311a.

The PSU 314a is a power supply circuit which supplies electric power to the respective portions of the CM 300a. The portions to which the electric power is to be supplied is determined according to the power-supply state of the CM 300a, where the power-supply state of the CM 300a is designated by the FPGA 311a.

2.3 Hardware Construction of Administration Terminal

Figure 4:
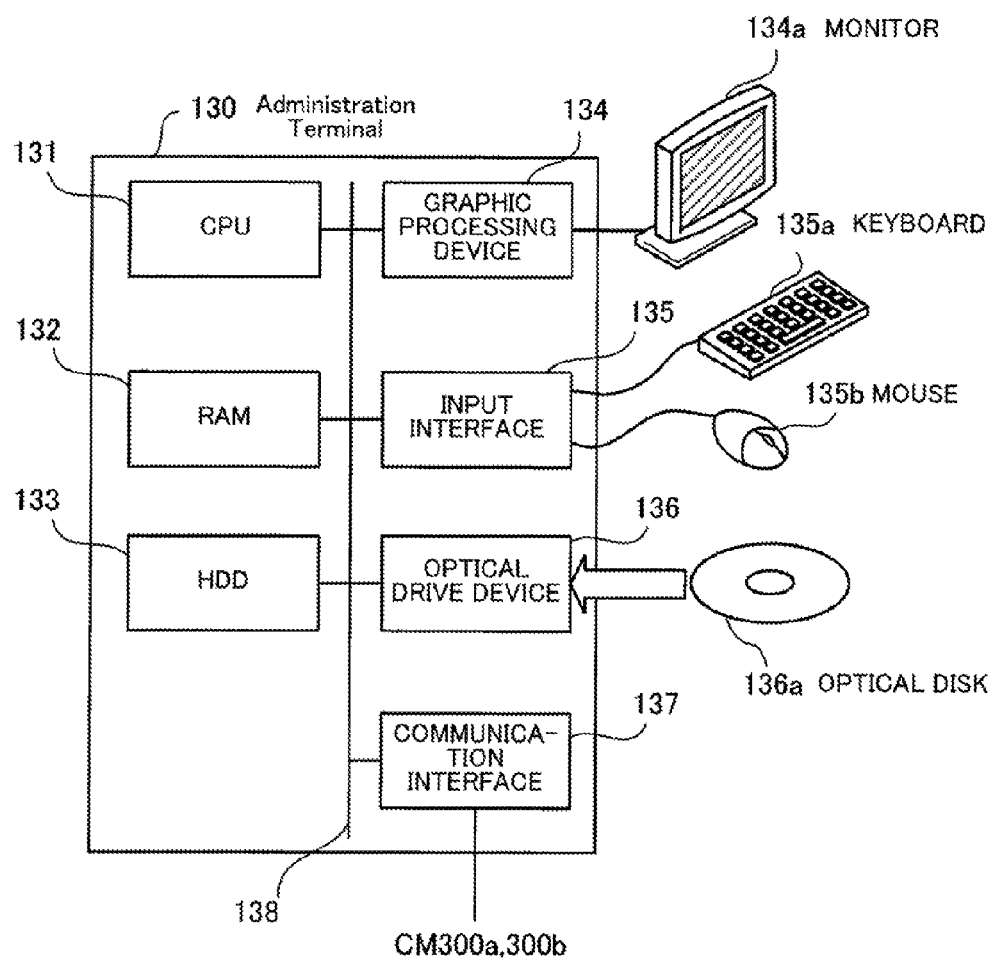
FIG. 4 illustrates an example of a hardware construction of an administration terminal in the storage system according to the second embodiment.

The administration terminal 130 can be realized by a computer as illustrated in FIG. 4, which illustrates an example of a hardware construction of the administration terminal. In the computer of FIG. 4, an RAM 132 and more than one peripheral device are connected to a CPU 131 through a bus 138. The RAM 132 is used as a main memory of the computer, and temporarily stores at least portions of programs to be executed by the CPU 131 and various types of data necessary for processing performed by the CPU 131. The more than one peripheral device connected to the bus 138 includes an HDD 133, a graphic processing device 134, an input interface 135, an optical drive device 136, and a communication interface 137.

The HDD 133 is used as a secondary storage device in the computer. The HDD 133 stores various data and programs executed by the CPU 131. Alternatively, a semiconductor storage device such as a flash memory can be used as the secondary storage device.

A monitor 134a is connected to the graphic processing device 134. The graphic processing device 134 makes the monitor 134a display an image on a screen in accordance with an instruction from the CPU 131. The monitor 134a may be a display device using a CRT (cathode ray tube) or liquid crystal. In addition, a keyboard 135a and a mouse 135b are connected to the input interface 135, which transmits signals sent from the keyboard 135a and the mouse 135b, to the CPU 131 through the bus 138. The mouse 135b is a kind of pointing device, and may be replaced with another pointing device such as a touchscreen, a graphic tablet, a touchpad, or a trackball.

The optical drive device 136 reads data recorded on an optical disk 136a by using laser light or the like. The optical disk 136a is a portable recording medium in which data are recorded in such a manner that the data can be read by using reflection of light. The optical disk 136a may be a DVD (Digital Versatile Disk), a DVD-RAM, a CD-ROM (Compact Disk-Read Only Memory), a CD-R (Recordable)/RW (Re-Writable), or the like.

The communication interface 137 is connected to the CMs 300a and 300b through a LAN cable, so that the administration terminal 130 can exchange data through the communication interface 137 with the CMs 300a and 300b.

Further, the host apparatus 120 is also realized by a hardware construction similar to FIG. 4. The host apparatus 120 comprises a communication interface which exchange data with the CMs 300a and 300b through an optical fiber cable.

2.4 Functions of Controller Modules

Figure 5:
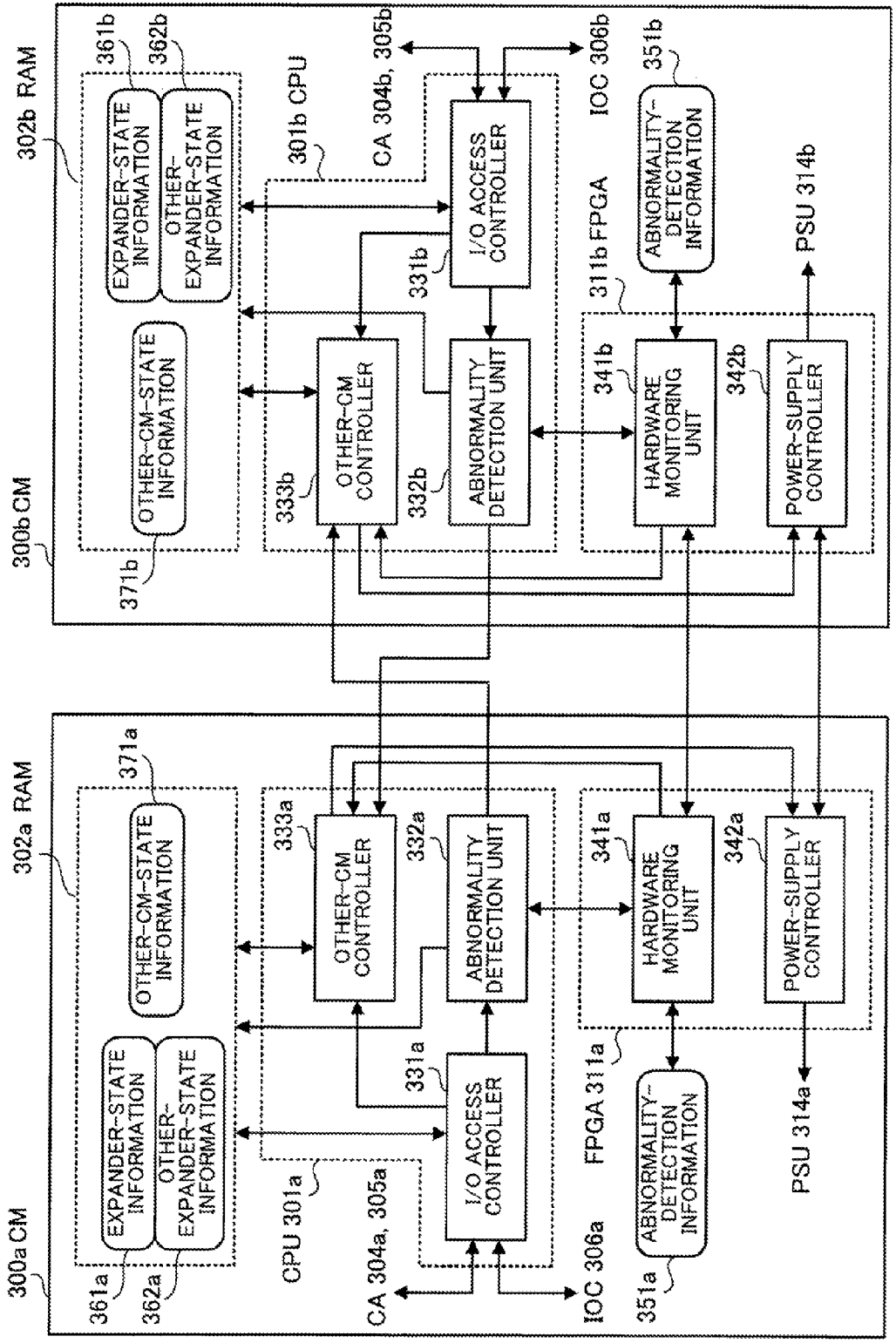
FIG. 5 is a block diagram illustrating the processing functions of the CMs in the storage system according to the second embodiment.

FIG. 5 is a block diagram illustrating the processing functions of the CMs in the storage system. The CM 300a comprises an I/O access controller 331a, an abnormality detection unit 332a, an other-CM controller 333a, a hardware monitoring unit 341a, and a power-supply controller 342a. The functions of the I/O access controller 331a, the abnormality detection unit 332a, and the other-CM controller 333a are realized by execution of a predetermined program by the CPU 301a. In addition, the functions of the hardware monitoring unit 341a and the power-supply controller 342a are realized by the FPGA 311a.

The CM 300b has processing functions similar to the CM 300a. Specifically, the CM 300b comprises an I/O access controller 331b, an abnormality detection unit 332b, an other-CM controller 333b, a hardware monitoring unit 341b, and a power-supply controller 342b, which have functions similar to the I/O access controller 331a, the abnormality detection unit 332a, the other-CM controller 333a, the hardware monitoring unit 341a, and the power-supply controller 342a, respectively. Similarly to the CM 300a, the functions of the I/O access controller 331b, the abnormality detection unit 332b, and the other-CM controller 333b are realized by execution of a predetermined program by the CPU 301b. In addition, the functions of the hardware monitoring unit 341b and the power-supply controller 342b are realized by the FPGA 311b. Therefore, only the functions of the CM 300a are explained below.

The I/O access controller 331a controls access to the HDDs in the DEs 210 and 220. Specifically, when the I/O access controller 331a receives from the CA 304a or 305a an access request being issued by the host apparatus 120 and requesting access to the HDDs in the DE 210 or 220, the I/O access controller 331a accesses the HDDs in the DE 210 or 220 through the IOC 306a and the SAS expander 307a or 307b. In addition, when the DEs 210 and 220 are accessed, the I/O access controller 331a determines which of the straight path and the cross path is to be used for access to the DEs 210 and 220, on the basis of expander-state information 361a and other-expander-state information 362a which are stored in the RAM 302a. Then, the I/O access controller 331a supplies to the IOC 306a an instruction as to which of the straight path and the cross path is to be used for access to the DEs 210 and 220.

The expander-state information 361a is information indicating the state of the SAS expander 307a in the CM 300a, and the other-expander-state information 362a is information indicating the state of the SAS expander 307b in the other CM 300b. Each of the expander-state information 361a and the other-expander-state information 362a takes on a value indicating the state "Normal" or the state "Faulty". The corresponding SAS expander is usable in the state "Normal", and unusable in the state "Faulty".

The I/O access controller 331a accesses the DEs 210 and 220 by using the path passing through one of the SAS expanders corresponding to one of the expander-state information 361a and the other-expander-state information 362a which indicates the state "Normal". For example, the I/O access controller 331a accesses the DEs 210 and 220 by using the straight path in the case where the expander-state information 361a indicates the state "Normal" and the other-expander-state information 362a indicates the state "Faulty", or by using the cross path in the case where the other-expander-state information 362a indicates the state "Normal" and the expander-state information 361a indicates the state "Faulty". In the case where both of the expander-state information 361a and the other-expander-state information 362a indicate the state "Normal", the I/O access controller 331a uses one of the straight path and the cross path in the access to the DEs 210 and 220 so that the straight path and the cross path are load balanced as much as possible. For example, the straight path and the cross path can be approximately load balanced by using each of the straight path and the cross path with the usage ratio of 50%. (For example, the usage ratio of 50% can be realized by alternately using the straight path and the cross path for access to the DEs 210 and 220.) Alternatively, the I/O access controller 331a may receive from the IOC 306a or the SAS expander 307a or 307b information on the amount of data transmitted per unit time through each of the straight path and the cross path, and select one of the straight path and the cross path so that the amount of data transmitted per unit time through the straight path and the amount of data transmitted per unit time through the cross path are more balanced.

In the case where failure in normal access through the straight path occurs at least a predetermined number of times, the I/O access controller 331a updates the expander-state information 361a to the state "Faulty", and notifies the abnormality detection unit 332a of the occurrence of the abnormality in the communication through the straight path. In the case where failure in normal access through the straight path occurs at least a predetermined number of times, the I/O access controller 331a updates the other-expander-state information 362a to the state "Faulty", and notifies the other-CM controller 333a of the occurrence of the abnormality in the communication through the cross path.

When the abnormality detection unit 332a detects occurrence of an abnormality in the CM 300a, the abnormality detection unit 332a generates abnormality-detection information 351a indicating details of the detected abnormality, and stores the abnormality-detection information 351a in the NVRAM 312a through the hardware monitoring unit 341a.

For example, the abnormality-detection information 351a is described with at least one code which can identify at least one of items of the location of the occurrence of the abnormality, details of processing during which the abnormality occurs, and the like. In addition, the abnormality detection unit 332a has, for example, a function of detecting by the CM 300a per se an abnormality in execution of a program by the CPU 301a. Further, the abnormality detection unit 332a detects an abnormality in the hardware of the CM 300a on the basis of a notification from the hardware monitoring unit 341a. Furthermore, the abnormality detection unit 332a detects an abnormality in communication through the straight path on the basis of the notification from the I/O access controller 331a.

When the abnormality detection unit 332a detects an abnormality in the CM 300a, the abnormality detection unit 332a generates abnormality-detection information 351a and stores the abnormality-detection information 351a in the NVRAM 312a, and transmits the abnormality-detection information 351a to the other-CM controller 333b in the CM 300b through the communication path P1. In addition, when the abnormality detection unit 332a detects an abnormality in the CM 300a, and the detected abnormality is related to the operation of the SAS expander 307a in the CM 300a, the abnormality detection unit 332a updates the expander-state information 361a to the state "Faulty".

When an abnormality occurs in the other CM 300b, the other-CM controller 333a determines the type of the abnormality in the CM 300b, and makes the CM 300b transition to a predetermined power-supply state according to the determined type of the abnormality. Specifically, the other-CM controller 333a determines the type of the abnormality in the CM 300b, on the basis of abnormality-detection information 351b indicating details of the abnormality occurring in the CM 300b and being sent from the abnormality detection unit 332b in the CM 300b. In addition, in the case where the other-CM controller 333a cannot perform communication with the CPU 301b in the CM 300b through the communication path P1, the other-CM controller 333a can acquire through the communication path P2 the abnormality-detection information 351b stored in the NVRAM 312b in the CM 300b. In this case, the other-CM controller 333a requests the hardware monitoring unit 341a to acquire the abnormality-detection information 351b stored in the NVRAM 312b in the CM 300b.

Further, the other-CM controller 333a recognizes the power-supply state and the operational state of the SAS expander 307b in the CM 300b, and utilizes of the recognition of the power-supply state and the operational state of the SAS expander 307b in the determination of the type of the abnormality. The power-supply state of the SAS expander 307b is information indicating whether or not the SAS expander 307b is powered on, and the operational state of the SAS expander 307b is information indicating whether or not the SAS expander 307b is normally operating. Specifically, the other-CM controller 333a acquires information on the power-supply state and the operational state of the SAS expander 307b through the cross path (i.e., the path connecting the IOC 306a in the CM 300a and the SAS expander 307b in the CM 300b). Alternatively, the other-CM controller 333a can acquire information on the power-supply state and the operational state of the SAS expander 307b through the communication path P2. In the latter case, the other-CM controller 333a requests the hardware monitoring unit 341a to acquire from the hardware monitoring unit 341b in the CM 300b the information on the power-supply state and the operational state of the SAS expander 307b.

Furthermore, the other-CM controller 333a requests the power-supply controller 342a to make the CM 300b transition to a predetermined power-supply state on the basis of the determination of the type of the abnormality occurring in the CM 300b. At this time, the power-supply controller 342a transmits the request to the power-supply controller 342b by performing communication with the power-supply controller 342b in the CM 300b through the communication path P2. In addition, other-CM-state information 371a indicating the power-supply state of the CM 300b is stored in the RAM 302a. Therefore, every time the power-supply state of the CM 300b transitions, the other-CM controller 333a updates the other-CM-state information 371a so that the other-CM-state information 371a indicates the power-supply state to which CM 300b transitions.

In the case where the result of the determination of the type of the abnormality occurring in the CM 300b indicates that the abnormality is related to the operation of the SAS expander 307b in the CM 300b, the other-CM controller 333a makes the power-supply state of the CM 300b transition to the state "P_State1". At this time, the other-CM controller 333a updates the other-expander-state information 362a to the state "Faulty". On the other hand, in the case where the result of the determination of the type of the abnormality occurring in the CM 300b indicates that the abnormality is not related to the operation of the SAS expander 307b in the CM 300b, the other-CM controller 333a makes the power-supply state of the CM 300b transition to the state "P_State2". The power-supply state "P_State1" is the power-supply state of the CM 300b in which power supply to the hardware of the CM 300b is stopped so that access to the DEs 210 and 220 through the CM 300b is not possible. The power-supply state "P_State2" is the power-supply state of the CM 300b in which power supply to the hardware of the CM 300b is partially stopped so that access to the DEs 210 and 220 through the SAS expander 307b is possible.

The hardware monitoring unit 341a monitors the operation of the respective hardware constituents in the CM 300a in order to detect occurrence of an abnormality. When the hardware monitoring unit 341a detects an abnormality in the hardware of the CM 300a, the hardware monitoring unit 341a sends to the abnormality detection unit 332a information indicating the hardware constituent in which the abnormality occurs. In this case, the hardware monitoring unit 341a receives from the abnormality detection unit 332a the abnormality-detection information 351a generated by the abnormality detection unit 332a, and stores the abnormality-detection information 351a in the NVRAM 312a. In the case where the abnormality detection unit 332a is not in operation (i.e., the CPU 301a is not in operation) when the hardware monitoring unit 341a detects the occurrence of the abnormality, the hardware monitoring unit 341a generates, by itself, the abnormality-detection information 351a, and stores the generated abnormality-detection information 351a in the NVRAM 312a.

In addition, the hardware monitoring unit 341a can read out the abnormality-detection information 351a from the NVRAM 312a in response to a request received from the hardware monitoring unit 341b in the CM 300b, and transmit the abnormality-detection information 351a to the hardware monitoring unit 341b. Further, the hardware monitoring unit 341a can request the hardware monitoring unit 341b for readout of the abnormality-detection information 351b stored in the NVRAM 312b in the CM 300b, in response to a request received from the other-CM controller 333a. In response to the request, the hardware monitoring unit 341b reads out the abnormality-detection information 351b from the NVRAM 312b in the CM 300b and transmits the abnormality-detection information 351b to the hardware monitoring unit 341a. Then, the hardware monitoring unit 341a receives the abnormality-detection information 351b from the hardware monitoring unit 341b, and transfers the abnormality-detection information 351b to the other-CM controller 333a.

The power-supply controller 342a controls the PSU 314a so as to make the CM 300a transition to a predetermined power-supply state. As explained later, the CM 300a can be in one of at least three power-supply states "P_State1", "P_State2", and "P_State3". In each of the power-supply states, electric power is supplied from the PSU 314a to different portions of the CM 300a. The power-supply controller 342a makes the power-supply state of the CM 300a transition in response to a request received from the other-CM controller 333a or the power-supply controller 342b in the CM 300b.

In addition, the power-supply controller 342a can request the power-supply controller 342b in the CM 300b to make the CM 300b transition to a predetermined power-supply state in response to a request received from the other-CM controller 333a. The CM 300b can also be in one of at least three power-supply states "P_State1", "P_State2", and "P_State3".

2.5 Power-Supply States of Controller Modules

Figure 6:
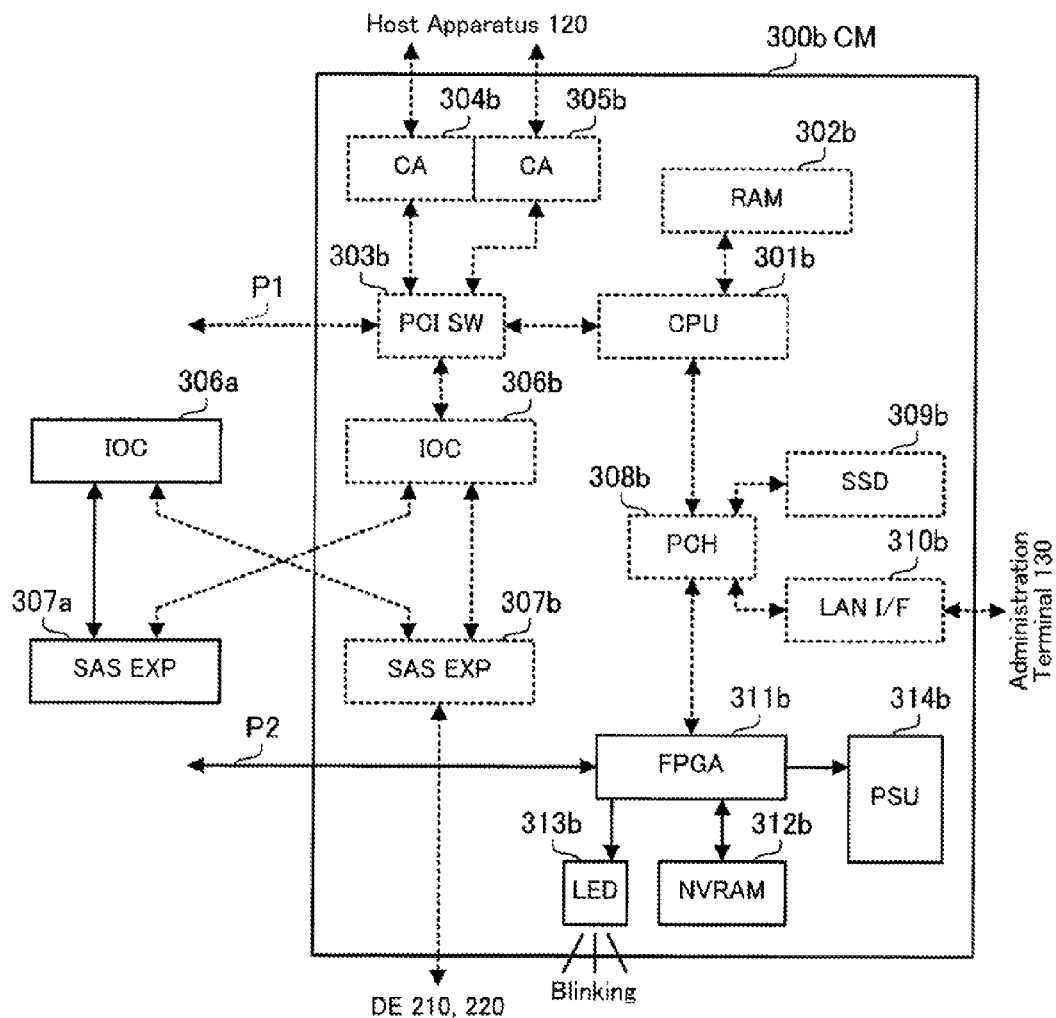
FIG. 6 illustrates details of power supply in one of the CMs in the storage system according to the second embodiment when the CM is in the power-supply state "P_State1"
Figure 7:
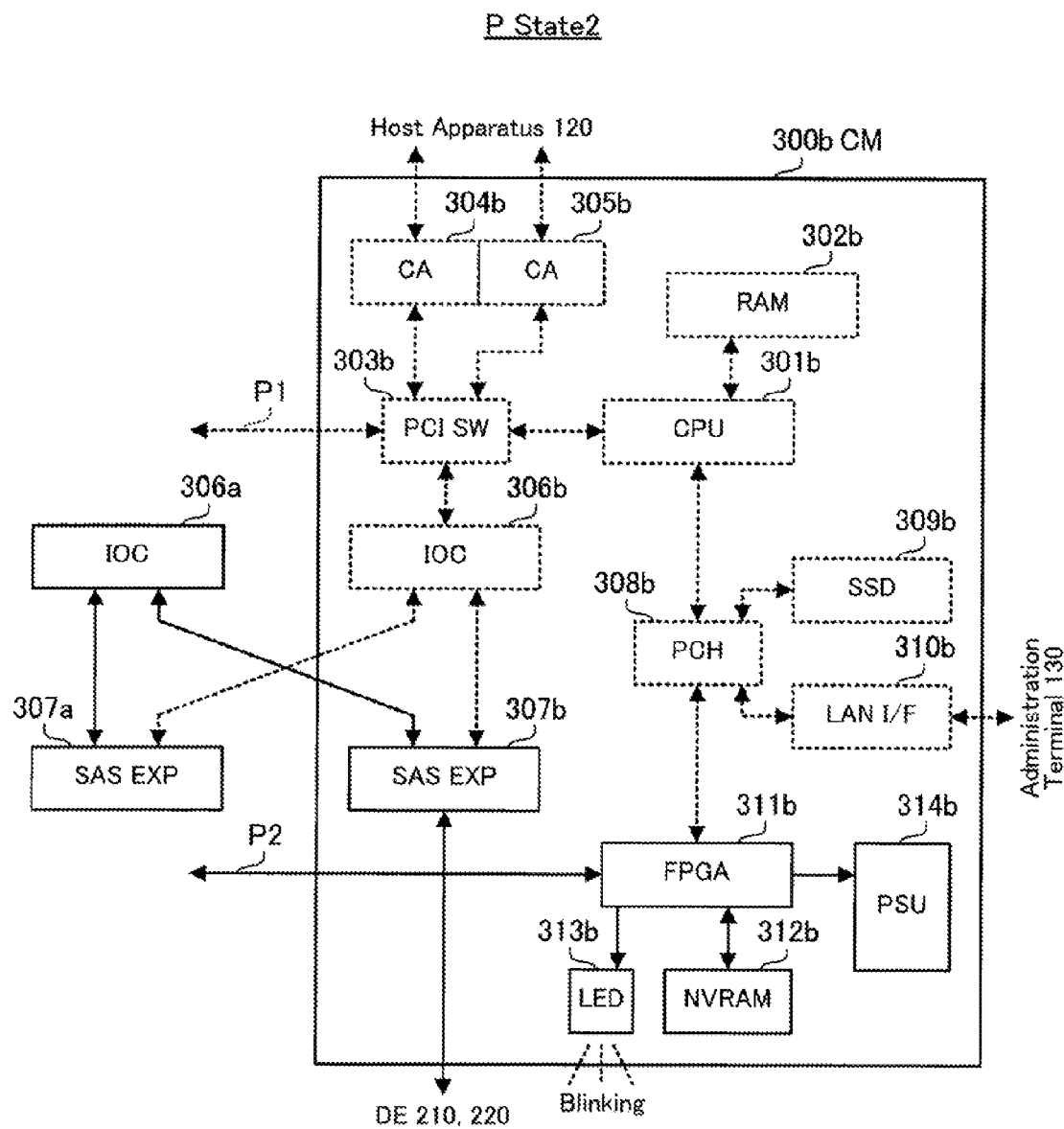
FIG. 7 illustrates details of power supply in the one of the CMs in the storage system according to the second embodiment when the CM is in the power-supply state "P_State2"

Hereinbelow, the power-supply states in which the CMs 300a and 300b can be are explained below with reference to FIGS. 6 and 7. FIG. 6 illustrates details of power supply in the power-supply state "P_State1" of the CM 300b, and FIG. 7 illustrates details of power supply in the power-supply state "P_State2" of the CM 300b. Although the following explanations are provided for only the CM 300b, the power-supply states of the CM 300a are similar to the power-supply states of the CM 300b. In FIGS. 6 and 7, the blocks of the hardware constituents which are in a non-operational state in which power supply is stopped are drawn in dotted lines, and signal paths through which signal transfer is impossible due to stoppage of the hardware constituents are indicated by arrows with dotted lines.

First, details of power supply in the power-supply state "P_State1" of the CM 300b are explained with reference to FIG. 6. When the CM 300b is in the power-supply state "P_State1", power supply from the PSU 314b to the CPU 301b, the RAM 302b, the PCI switch 303b, the CAs 304b and 305b, the IOC 306b, the SAS expander 307b, the PCH 308b, the SSD 309b, and the LAN interface 310b is stopped. On the other hand, electric power is supplied from the PSU 314b to the FPGA 311b and the LED unit 313b. Therefore, the FPGA 311b can read and write data from and in the NVRAM 312b. Since the CPU 301b, the CAs 304b and 305b, the IOC 306b, and the SAS expander 307b are not in operation in the power-supply state "P_State1" of the CM 300b, the host apparatus 120 cannot access the DEs 210 and 220 through the CM 300b. In addition, the CM 300a cannot access the DEs 210 and 220 through the cross path (i.e., the path passing through the SAS expander 307b in the CM 300b).

Further, when the CM 300b is in the power-supply state "P_State1", the CM 300b can be detached from a chassis of the storage system 100. The power-supply controller 342b illustrated in FIG. 5 and realized by the FPGA 311b turns on the LED unit 313b so as to indicate that the CM 300b is in the state in which the CM 300b can be detached.

Furthermore, when the CM 300b is in the power-supply state "P_State1", the power-supply controller 342b realized by the FPGA 311b can make the CM 300b transition to the power-supply state "P_State3" (which is a normal operational state) in response to a request received from the other CM 300a through the communication path P2. Although not shown, in the power-supply state "P_State3", electric power is supplied from the PSU 314b to all the hardware constituents in the CM 300b.

Next, details of power supply in the power-supply state "P_State2" of the CM 300b are explained with reference to FIG. 7. The power-supply state "P_State2" of the CM 300b is different from the power-supply state "P_State1" in that electric power is supplied from the PSU 314b to the SAS expander 307b as well as the FPGA 311b and the LED unit 313b. Since the operation of the CAs 304b and 305b, the CPU 301b, and the IOC 306b is stopped, the host apparatus 120 cannot access the DEs 210 and 220 through the CM 300b. However, since the SAS expander 307b in the CM 300b is in operation, the CM 300a can access the DEs 210 and 220 by using the cross path passing through the SAS expander 307b. Thus, when the CM 300b is in the power-supply state "P_State2", the CM 300a can selectively use the straight path or the cross path for access to the DEs 210 and 220. That is, the redundancy of the access path from the CM 300a to the DEs 210 and 220 is maintained.

In addition, when the CM 300b is in the "P_State2", the power-supply controller 342b illustrated in FIG. 5 and realized by the FPGA 311b can make the CM 300b transition to the power-supply state "P_State1" or "P_State3" in response to a request received from the CM 300a through the communication path P2.

Further, when the power-supply controller 342b makes the CM 300b transition to the power-supply state "P_State2", the power-supply controller 342b realized by the FPGA 311b makes the LED unit 313b blink. Since the LED unit 313b continuously emit light in the power-supply state "P_State1" of the CM 300b and blinks in the power-supply state "P_State2" of the CM 300b, the maintenance technician can visually recognize the power-supply state "P_State1" or "P_State2" of the CM 300b. When the CM 300b is in the power-supply state "P_State2", the SAS expander 307b in the CM 300b may be being used in the cross path for access from the other CM 300a to the DEs 210 and 220. If the CM 300b in the power-supply state "P_State2" is detached from the storage system 100, processing performed by the CM 300a for access to the DEs 210 and 220 can be harmfully affected. Therefore, it is undesirable to detach the CM 300b from the storage system 100 when the CM 300b is in the power-supply state "P_State2". Since the power-supply state "P_State2" of the CM 300b is indicated by the LED unit 313b, the indication by the LED unit 313b can caution the maintenance technician not to detach the CM 300b immediately.

Furthermore, the storage system 100 may be configured so that each of the CMs 300a and 300b can transition to a power-supply state "P_State4". For example, the power-supply state "P_State4" of the CM 300b is different from the power-supply state "P_State1" of the CM 300b in that electric power is supplied to the CPU 301b, the RAM 302b, the PCH 308b, and the SSD 309b from a battery which is realized by, for example, an electric double-layer capacitor and is arranged in the chassis of the storage system 100, while electric power is also supplied to the FPGA 311b and the LED unit 313b as in the power-supply state "P_State1".

In the CM 300b in the power-supply state "P_State4", data cached in the RAM 302b in correspondence with to one or more portions of the data in the HDDs in the DEs 210 and 220 are saved in the SSD 309b by the CPU 301b. Since electric power is supplied to only the minimum hardware constituents necessary for the saving of the cache data in the power-supply state "P_State4", it is possible to suppress the power consumption in the battery.

2.6 Processing after Occurrence of Abnormality

2.6.1 Functions and Information in Processing

Figure 8:
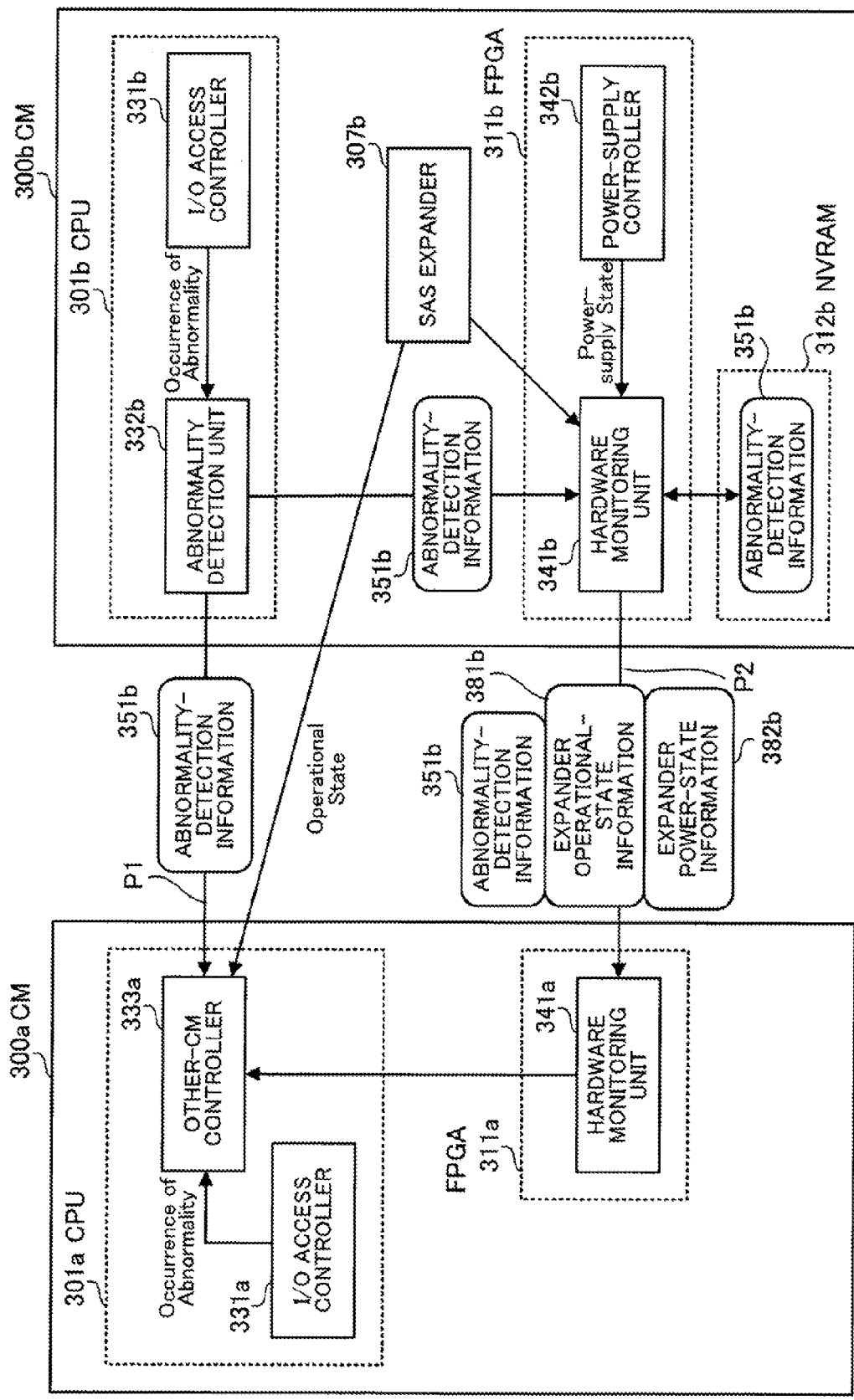
FIG. 8 illustrates the processing functions of the CMs in the storage system according to the second embodiment when an abnormality occurs in one of the CMs.

An example of processing performed when an abnormality occurs in one of the CMs is explained below. As an example, processing which is performed after the CM 300a detects that an abnormality occurs in the CM 300b is explained below with reference to FIG. 8. FIG. 8 illustrates the processing functions of the CMs in the storage system 100 when an abnormality occurs in the CM 300b.

When the other-CM controller 333a in the CM 300a detects occurrence of an abnormality in the other CM 300b, the other-CM controller 333a acquires the abnormality-detection information 351b, expander operational-state information 381b, and expander power-state information 382b. The abnormality-detection information 351b indicates the abnormality occurring in the CM 300b as mentioned before. The expander operational-state information 381b is information indicating whether or not the SAS expander 307b in the CM 300b is in operation, and the expander power-state information 382b is information indicating whether or not the SAS expander 307b is powered on.

The other-CM controller 333a can acquire the abnormality-detection information 351b through more than one path as explained below. Therefore, the other-CM controller 333a can receive the abnormality-detection information 351b with high reliability. In addition, since the other-CM controller 333a receives the expander operational-state information 381b and the expander power-state information 382b, the other-CM controller 333a can determine, with high reliability, whether or not the SAS expander 307a can be used even after the abnormality in the CM 300b is detected.

Specifically, the other-CM controller 333a can receive the abnormality-detection information 351b through either of the communication paths P1 and P2. For example, when the abnormality detection unit 332b detects an abnormality in the CM 300b, the abnormality detection unit 332b generates the abnormality-detection information 351b, and stores the abnormality-detection information 351b in the NVRAM 312b through the hardware monitoring unit 341b. In addition, the abnormality detection unit 332b transmits the abnormality-detection information 351b to the other-CM controller 333a in the CM 300a through the communication path P1. For example, after the abnormality detection unit 332b notifies the other-CM controller 333a in the CM 300a of the occurrence of the abnormality, the abnormality detection unit 332b may transmit the abnormality-detection information 351b to the other-CM controller 333a in the CM 300a in response to a request from the other-CM controller 333a. Further, the abnormality detection unit 332b may read out the abnormality-detection information 351b from the NVRAM 312b, and transmit the abnormality-detection information 351b to the other-CM controller 333a in the CM 300a.

2.6.2 Detection of Abnormality by Abnormality Detection Unit

Processing performed by the abnormality detection unit 332b for detecting an abnormality is explained below. The abnormality detection unit 332b detects by itself an abnormality occurring during execution of a program by the CPU 301b. In addition, the abnormality detection unit 332b detects an abnormality in the hardware constituents of the CM 300b on the basis of a notification from the hardware monitoring unit 341b. Specifically, the hardware monitoring unit 341b detects whether or not each hardware constituent of the CM 300b is normally operating, for example, as follows. The hardware monitoring unit 341b has a watch-dog timer for each hardware constituent to be monitored. Consider, for example, detection of an abnormality in the SAS expander 307b. The SAS expander 307b periodically resets the watch-dog timer provided in the hardware monitoring unit 341b in correspondence with the SAS expander 307b. When the count of the watch-dog timer corresponding to the SAS expander 307b reaches a predetermined value without being reset by the SAS expander 307b, the hardware monitoring unit 341b determines that an abnormality occurs in the SAS expander 307b, and notifies the abnormality detection unit 332b of the occurrence of the abnormality in the SAS expander 307b.

The abnormality detection unit 332b detects an abnormality in communication using the straight path, on the basis of one or more notifications from the I/O access controller 331b. In the case where failure in normal access through the straight path occurs at least a predetermined number of times, the I/O access controller 331b determines that an abnormality occurs in the straight path, and notifies the abnormality detection unit 332b of the occurrence of the abnormality in the straight path. Details of the processing performed by the I/O access controller 331b for detecting an abnormality are explained later with reference to FIG. 9.

2.6.3 Acquisition of Abnormality-Detection Information

In the case where the CPU 301b is not in operation when an abnormality occurs in the CM 300b, the other-CM controller 333a in the CM 300a acquires the abnormality-detection information 351b from the CM 300b through the communication path P2. In the case where the hardware monitoring unit 341b in the CM 300b cannot perform communication with the abnormality detection unit 332b due to stoppage of the CPU 301b when an abnormality in the hardware of the CM 300b is detected, the hardware monitoring unit 341b generates by itself the abnormality-detection information 351b and stores the abnormality-detection information 351b in the NVRAM 312b. The other-CM controller 333a in the CM 300a periodically communicates with the CPU 301b in the CM 300b through the communication path P1. When the communication with the CPU 301b is broken off, the other-CM controller 333a transmits a request for the abnormality-detection information 351b through the communication path P2 to the CM 300b. Specifically, when the other-CM controller 333a detects occurrence of an abnormality in the CM 300b by the break in the communication with the CPU 301b, the other-CM controller 333a sends to the hardware monitoring unit 341a a request for acquisition of the abnormality-detection information 351b from the CM 300b. When the hardware monitoring unit 341a receives the request for acquisition of the abnormality-detection information 351b, the hardware monitoring unit 341a communicates with the hardware monitoring unit 341b in the CM 300b through the communication path P2, and transmits a request for the abnormality-detection information 351b which is stored in the NVRAM 312b. When the hardware monitoring unit 341b receives the request for the abnormality-detection information 351b, the hardware monitoring unit 341b reads out the abnormality-detection information 351b from the NVRAM 312b, and transmits the abnormality-detection information 351b to the hardware monitoring unit 341a in the CM 300a through the communication path P2. Then, the hardware monitoring unit 341a receives the abnormality-detection information 351b, and transfers the abnormality-detection information 351b to the other-CM controller 333a.

In some cases, the other-CM controller 333a receives from the I/O access controller 331a a notification of occurrence of an abnormality in the CM 300b when the I/O access controller 331a detects occurrence of an abnormality in the cross path passing through the SAS expander 307b. In the case where the CPU 301b in the CM 300b is in operation when the other-CM controller 333a receives the above notification, the other-CM controller 333a transmits to the abnormality detection unit 332b in the CM 300b a request for the abnormality-detection information 351b. On the other hand, in the case where the CPU 301b in the CM 300b is not in operation when the other-CM controller 333a receives the above notification, the other-CM controller 333a can acquire the abnormality-detection information 351b through the communication path P2.

2.6.4 Acquisition of Expander Operational-State Information and Expander Power-State Information A path for acquiring the expander operational-state information 381b and the expander power-state information 382b is explained below. The other-CM controller 333a in the CM 300a acquires the expander operational-state information 381b and the expander power-state information 382b from the CM 300b through the communication path P2. Specifically, when the other-CM controller 333a detects an abnormality in the CM 300b, the other-CM controller 333a sends to the hardware monitoring unit 341a a request for acquisition of the expander operational-state information 381b and the expander power-state information 382b from the CM 300b. When the hardware monitoring unit 341a receives the above request, the hardware monitoring unit 341a communicates with the hardware monitoring unit 341b in the CM 300b through the communication path P2, and transmits to the hardware monitoring unit 341b a request for the expander operational-state information 381b and the expander power-state information 382b. When the hardware monitoring unit 341b receives the above request transmitted from the hardware monitoring unit 341a, the hardware monitoring unit 341b generates the expander operational-state information 381b and the expander power-state information 382b. For example, the hardware monitoring unit 341b determines whether or not the SAS expander 307b is in operation, on the basis of the count of the watch-dog timer corresponding to the SAS expander 307b as mentioned before, and describes the result of the determination in the expander operational-state information 381b. In addition, the hardware monitoring unit 341b inquires the current power-supply state of the CM 300b from the power-supply controller 342b, determines whether or not electric power is supplied to the SAS expander 307b, on the basis of information on the power-supply state obtained from the power-supply controller 342b, and describes the result of the determination in the expander power-state information 382b. The hardware monitoring unit 341b transmits to the expander operational-state information 381b and the expander power-state information 382b generated as above, to the hardware monitoring unit 341a in the CM 300a through the communication path P2. The hardware monitoring unit 341a transfers to the other-CM controller 333a the received the expander operational-state information 381b and the expander power-state information 382b. Alternatively, the other-CM controller 333a can determine whether or not the SAS expander 307b is in operation, by performing an operation for access to the SAS expander 307b through the cross path. That is, the other-CM controller 333a can determine the operational state of the SAS expander 307b in the two ways, the acquisition of the expander operational-state information 381b through the communication path P2 and the access to the SAS expander 307b through the cross path. Therefore, the other-CM controller 333a can determine, with high reliability, whether or not the SAS expander 307b in the CM 300b is still usable even after the abnormality in the CM 300b is detected.

2.6.5 Detection of Abnormality by I/O Access Controller

Figure 9:
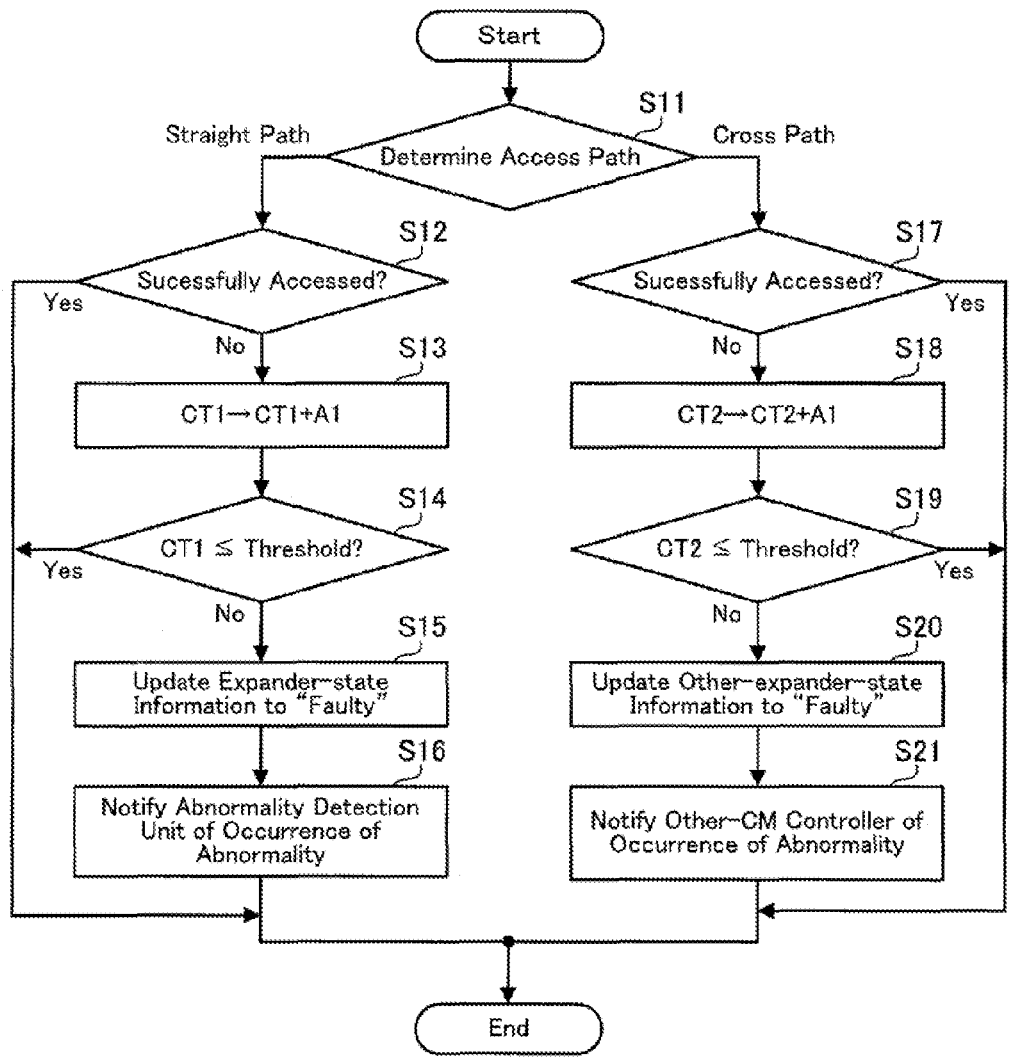
FIG. 9 is a flow diagram indicating a sequence of operations for detecting an abnormality which are performed by an I/O access controller in one of the CMs in the storage system according to the second embodiment.

Processing for detecting an abnormality performed by the I/O access controller in each CM is explained below with reference to FIG. 9. FIG. 9 is a flow diagram indicating a sequence of operations for detecting an abnormality which are performed by the I/O access controller. Although the following explanations are provided for only the processing performed by the I/O access controller 331a in the CM 300a, the I/O access controller 331b in the CM 300b can also perform similar processing.

<Step S11> The I/O access controller 331a receives through the CA 304a or 305a a request for access to the HDDs in the DEs 210 and 220, where the request is issued from the host apparatus 120. (Hereinafter, the HDDs in the DEs 210 and 220 are simply referred to as the HDDs.) Then, the I/O access controller 331a determines the straight path or the cross path through which the HDDs are to be accessed. The I/O access controller 331a refers to the expander-state information 361a and the other-expander-state information 362a which are stored in the RAM 302a, and selects an access path passing through an SAS expander which is in the state "Normal". In the case where both of the expander-state information 361a and the other-expander-state information 362a indicate "Normal", the I/O access controller 331a determines the access path so that the access load is more balanced. For example, as mentioned before, the I/O access controller 331a determines the access path so that the usage ratio of each of the straight path and the cross path approaches 50%, for example, by alternately using the straight path and the cross path for access to the DEs 210 and 220. Thus, the straight path and the cross path can be approximately load balanced.

The I/O access controller 331a performs the operation in step S12 in the case where the I/O access controller 331a accesses the HDDs through the straight path, and the operation in step S17 in the case where the I/O access controller 331a accesses the HDDs through the cross path.

<Step S12> The I/O access controller 331a makes the IOC 306a perform an operation for accessing the HDDs through the straight path. Then, the I/O access controller 331a determines whether or not the HDDs have been successfully accessed, on the basis of a result of the operation for accessing the HDDs performed by the IOC 306a. The I/O access controller 331a completes the processing of FIG. 9 when the HDDs have been successfully accessed (i.e., when yes is determined in step S12), and performs the operation in step S13 when the HDDs are not successfully accessed (i.e., when no is determined in step S12).

<Step S13> The I/O access controller 331a adds a predetermined addend A1 to an abnormality detection count CT1, and updates the abnormality detection count CT1 stored in the RAM 302a in the CM 300a, with the added result. The abnormality detection count CT1 is a count corresponding to the accumulated number of abnormalities detected in the straight path, and stored in the RAM 302a. The initial value of the abnormality detection count CT1 is zero.

<Step S14> The I/O access controller 331a determines whether or not the added result in step S13 is equal to or smaller than a predetermined threshold. The I/O access controller 331a completes the processing of FIG. 9 when the added result in step S13 is equal to or smaller than the predetermined threshold (i.e., when yes is determined in step S14), and performs the operation in step S15 when the added result in step S13 exceeds the predetermined threshold (i.e., when no is determined in step S14).

<Step S15> The I/O access controller 331a updates the expander-state information 361a (indicating the state of the SAS expander 307a in the CM 300a) to "Faulty", so that access to the HDDs using the straight path is forbidden.

<Step S16> The I/O access controller 331a notifies the abnormality detection unit 332a of the occurrence of the abnormality in the straight path. Then, the abnormality detection unit 332a generates the abnormality-detection information 351a on the basis of the notification by the I/O access controller 331a, notifies the other-CM controller 333a in the CM 300a of the occurrence of the abnormality, and supplies the abnormality-detection information 351a to the other-CM controller 333a.

<Step S17> The I/O access controller 331a makes the IOC 306a perform an operation for accessing the HDDs through the cross path. Then, the I/O access controller 331a determines whether or not the HDDs have been successfully accessed, on the basis of a result of the operation for accessing the HDDs performed by the IOC 306a. The I/O access controller 331a completes the processing of FIG. 9 when the HDDs are successfully accessed (i.e., when yes is determined in step S17), and performs the operation in step S18 when the HDDs are not successfully accessed (i.e., when no is determined in step S17).

<Step S18> The I/O access controller 331a adds the predetermined addend A1 to an abnormality detection count CT2, and updates the abnormality detection count CT2 stored in the RAM 302a in the CM 300a, with the added result. The abnormality detection count CT2 is a count corresponding to the accumulated number of abnormalities detected in the cross path, and stored in the RAM 302a. The initial value of the abnormality detection count CT2 is zero.

<Step S19> The I/O access controller 331a determines whether or not the added result in step S18 is equal to or smaller than a predetermined threshold, which may be equal to the predetermined threshold in step S14. The I/O access controller 331a completes the processing of FIG. 9 when the added result in step S18 is equal to or smaller than the predetermined threshold (i.e., when yes is determined in step S19), and performs the operation in step S20 when the added result in step S18 exceeds the predetermined threshold (i.e., when no is determined in step S19).

<Step S20> The I/O access controller 331a updates the other-expander-state information 362a (indicating the state of the SAS expander 307b in the CM 300b) to "Faulty", so that access to the HDDs using the cross path is forbidden.

<Step S21> The I/O access controller 331a notifies the other-CM controller 333a of the occurrence of the abnormality in the cross path. Then, the other-CM controller 333a detects occurrence of an abnormality in the CM 300b on the basis of the notification from the I/O access controller 331a, and acquires from the CM 300b the abnormality-detection information 351b, the expander operational-state information 381b, and the expander power-state information 382b.

Further, in the case where the I/O access controller 331a can determine the cause of a failure in the operation for access to the HDDs in the processing of FIG. 9, the addends A1 in steps S13 and S18 may be differentiated according to the cause of the failure. For example, the addends A1 may be increased with the importance of the cause in the failure.

2.6.6 Processing by Other-CM Controller on Detection of Abnormality

Figure 10:
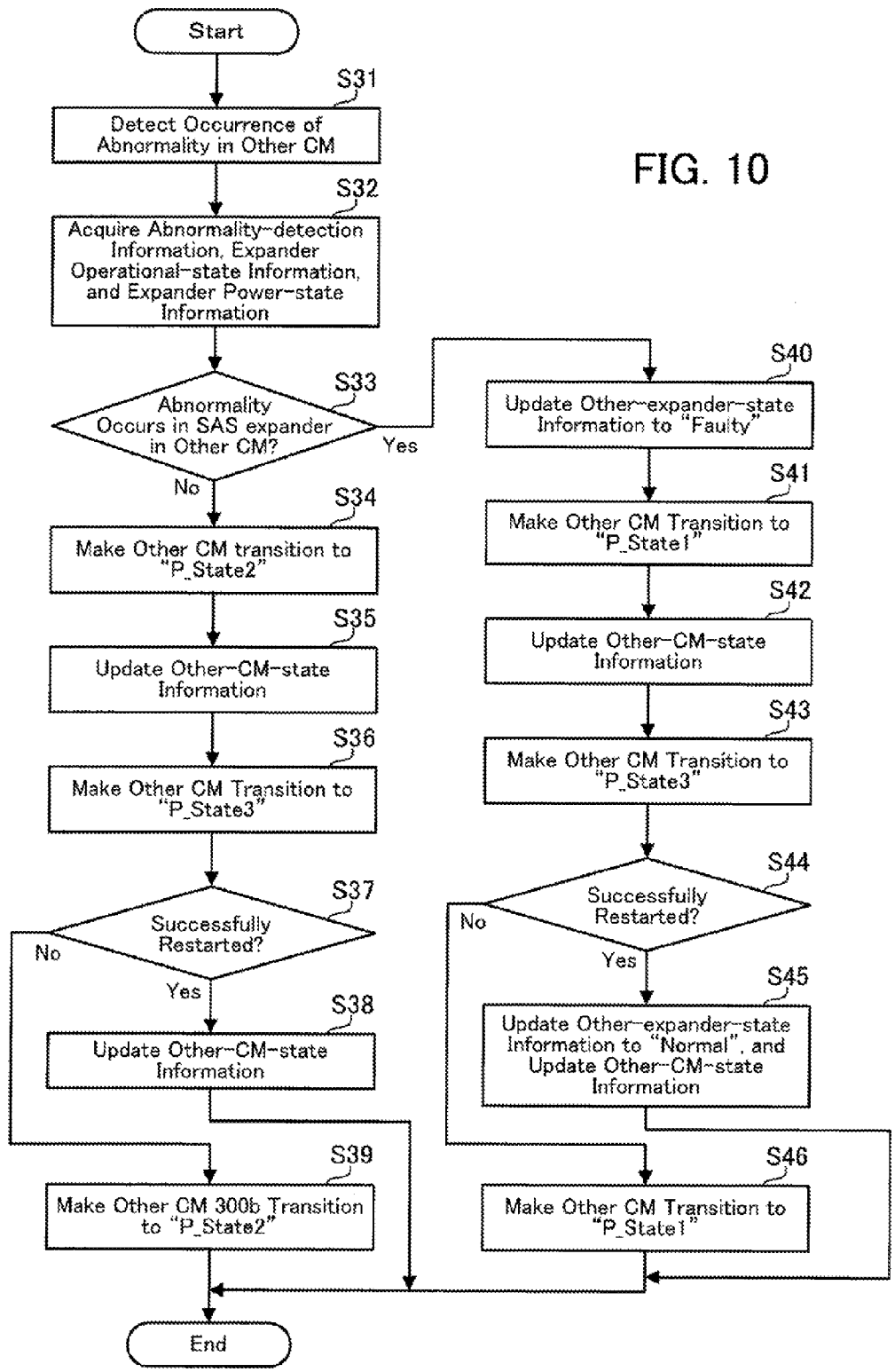
FIG. 10 is a flow diagram indicating a sequence of operations which are performed by an other-CM controller in one of the CMs in the storage system according to the second embodiment when an abnormality occurs in the other of the CMs.

Processing performed by the other-CM controller in one of the CMs when occurrence of an abnormality in the other of the CMs is detected is explained below with reference to FIG. 10. FIG. 10 is a flow diagram indicating a sequence of operations which are performed by the other-CM controller in each CM when occurrence of an abnormality in the other CM is detected. Although the following explanations are provided for only the processing performed by the other-CM controller 333a in the CM 300a, the other-CM controller 333b in the CM 300b can also perform similar processing.

<Step S31> The other-CM controller 333a in the CM 300a detects occurrence of an abnormality in the other CM 300b. For example, when the other-CM controller 333a receives a notification of detection of an abnormality or the abnormality-detection information 351b from the abnormality detection unit 332b in the CM 300b, or when communication with the CPU 301b in the CM 300b through the communication path P1 is broken off, or when the other-CM controller 333a receives from the I/O access controller 331a in the CM 300a a notification of occurrence of an abnormality in the cross path, the other-CM controller 333a detects occurrence of the abnormality in the CM 300b.

<Step S32> The other-CM controller 333a acquires from the CM 300b the abnormality-detection information 351b, the expander operational-state information 381b, and the expander power-state information 382b in the manners explained before with reference to FIG. 8. In the case where the other-CM controller 333a detects the occurrence of the abnormality in the CM 300b by receiving the abnormality-detection information 351b from the abnormality detection unit 332b in the CM 300b in step S31, the other-CM controller 333a acquires the expander operational-state information 381b and the expander power-state information 382b in step S32.

<Step S33> The other-CM controller 333a determines whether or not an abnormality occurs in the SAS expander 307b in the CM 300b, on the basis of the abnormality-detection information 351b, the expander operational-state information 381b, and the expander power-state information 382b which are obtained in step S32 (or in steps S31 and S32). In the case where the abnormality-detection information 351b indicates that the abnormality is not related to the operation of the SAS expander 307b, and the expander operational-state information 381b indicates that the SAS expander 307b is in operation, and the expander power-state information 382b indicates that the SAS expander 307b is powered on, the other-CM controller 333a determines, in step S33, that no abnormality occurs in the SAS expander 307b (i.e., no is determined in step S33), the other-CM controller 333a performs the operation in step S34. On the other hand, in the case where the abnormality-detection information 351b indicates that the abnormality is related to the operation of the SAS expander 307b, or the expander operational-state information 381b indicates that the SAS expander 307b is not in operation, or the expander power-state information 382b indicates that the SAS expander 307b is not powered on, the other-CM controller 333a determines, in step S33, that an abnormality occurs in the SAS expander 307b (i.e., yes is determined in step S33), the other-CM controller 333a performs the operation in step S40.

<Step S34> In the case where the other-CM controller 333a determines, in step S33, that no abnormality occurs in the SAS expander 307b, the other-CM controller 333a requests the power-supply controller 342a to make the CM 300b transition to the power-supply state "P_State2". On receipt of the request, the power-supply controller 342a communicates with the power-supply controller 342b in the CM 300b through the communication path P2, and requests the power-supply controller 342b to make the CM 300b transition to the power-supply state "P_State2". On receipt of the request from the power-supply controller 342a, the power-supply controller 342b controls the PSU 314b so as to make the CM 300b transition to the power-supply state "P_State2".

<Step S35> The other-CM controller 333a updates the other-CM-state information 371a stored in the RAM 302a, so as to indicate "P_State2".

<Step S36> The other-CM controller 333a requests the power-supply controller 342a to make the CM 300b transition to the power-supply state "P_State3", which is the normal operational state. The operation of making the CM 300b transition to the power-supply state "P_State3" restarts the entire CM 300b. However, in the restarting operation by which the power-supply state of the CM 300b transitions from "P_State2" to "P_State3", the operation of the SAS expander 307b for relaying the communication between the IOC 306a and the DEs 210 and 220 is not stopped, and the hardware constituents of the CM 300b including the CPU 301b are reset so that the hardware constituents of the CM 300b can be reused. On receipt of the request for the transition of the power-supply state, the power-supply controller 342a communicates with the power-supply controller 342b in the CM 300b through the communication path P2, and transmits to the power-supply controller 342b a request to make the CM 300b transition to the power-supply state "P_State3". On receipt of the request to make the CM 300b transition, the power-supply controller 342b controls the PSU 314b so as to continue the power supply to the SAS expander 307b and make the CM 300b transition to the power-supply state "P_State3" while maintaining the normal operation of the SAS expander 307b.

<Step S37> The other-CM controller 333a determines whether or not the restarting operation of the CM 300b is successfully performed. For example, in the case where the other-CM controller 333a can normally communicate with the CPU 301b in the CM 300b through the communication path P1, the other-CM controller 333a determines that the restarting operation of the CM 300b is successfully performed (i.e., yes is determined in step S37), and performs the operation in step S38. On the other hand, in the case where the other-CM controller 333a cannot normally communicate with the CPU 301b in the CM 300b through the communication path P1, the other-CM controller 333a determines that the restarting operation of the CM 300b fails (i.e., no is determined in step S37), and performs the operation in step S39.

<Step S38> The other-CM controller 333a updates the other-CM-state information 371a stored in the RAM 302a, so as to indicate "P_State3".

<Step S39> The other-CM controller 333a requests the power-supply controller 342a to make the CM 300b transition to the power-supply state "P_State2". On receipt of the request for the transition of the power-supply state, the power-supply controller 342a communicates with the power-supply controller 342b in the CM 300b through the communication path P2, and transmits to the power-supply controller 342b a request to make the CM 300b transition to the power-supply state "P_State2". On receipt of the request to make the CM 300b transition, the power-supply controller 342b controls the PSU 314b so as to make the CM 300b transition to the power-supply state "P_State2".

<Step S40> In the case where the other-CM controller 333a determines, in step S33, that an abnormality occurs in the SAS expander 307b, the other-CM controller 333a updates the other-expander-state information 362a stored in the RAM 302a, to "Faulty". Therefore, the I/O access controller 331a (which refers to the other-expander-state information 362a for access to the DEs 210 and 220) becomes unable to access the DEs 210 and 220 through the cross path.

<Step S41> The other-CM controller 333a requests the power-supply controller 342a to make the CM 300b transition to the power-supply state "P_State1". On receipt of the request for the transition of the power-supply state, the power-supply controller 342a communicates with the power-supply controller 342b in the CM 300b through the communication path P2, and transmits to the power-supply controller 342b a request to make the CM 300b transition to the power-supply state "P_State1". On receipt of the request to make the CM 300b transition, the power-supply controller 342b controls the PSU 314b so as to make the CM 300b transition to the power-supply state "P_State1".

<Step S42> The other-CM controller 333a updates the other-CM-state information 371a stored in the RAM 302a, so as to indicate "P_State1".

<Step S43> The other-CM controller 333a requests the power-supply controller 342a to make the CM 300b transition to the power-supply state "P_State3", which is the normal operational state. The operation of making the CM 300b transition to the power-supply state "P_State3" restarts the entire CM 300b. On receipt of the request for the transition of the power-supply state, the power-supply controller 342a communicates with the power-supply controller 342b in the CM 300b through the communication path P2, and transmits to the power-supply controller 342b a request to make the CM 300b transition to the power-supply state "P_State3". On receipt of the request to make the CM 300b transition, the power-supply controller 342b controls the PSU 314b so as to make the CM 300b transition to the power-supply state "P_State3".

<Step S44> The other-CM controller 333a determines whether or not the restarting operation of the CM 300b is successfully performed. For example, in the case where the other-CM controller 333a can normally communicate with the CPU 301b in the CM 300b through the communication path P1, the other-CM controller 333a determines that the restarting operation of the CM 300b is successfully performed (i.e., yes is determined in step S44), and performs the operation in step S45. On the other hand, in the case where the other-CM controller 333a cannot normally communicate with the CPU 301b in the CM 300b through the communication path P1, the other-CM controller 333a determines that the restarting operation of the CM 300b fails (i.e., no is determined in step S44), and performs the operation in step S46.

<Step S45> The other-CM controller 333a updates the other-expander-state information 362a stored in the RAM 302a, so as to indicate "Normal". Therefore, the I/O access controller 331a (which refers to the other-expander-state information 362a for access to the DEs 210 and 220) becomes capable of accessing the DEs 210 and 220 through the cross path. In addition, the other-CM controller 333a updates the other-CM-state information 371a stored in the RAM 302a, so as to indicate "P_State3".

<Step S46> The other-CM controller 333a requests the power-supply controller 342a to make the CM 300b transition to the power-supply state "P_State1". On receipt of the request for the transition of the power-supply state, the power-supply controller 342a communicates with the power-supply controller 342b in the CM 300b through the communication path P2, and transmits to the power-supply controller 342b a request to make the CM 300b transition to the power-supply state "P_State1". On receipt of the request to make the CM 300b transition, the power-supply controller 342b controls the PSU 314b so as to make the CM 300b transition to the power-supply state "P_State1".

In the above processing of FIG. 10, when occurrence of an abnormality in the CM 300b is detected, the other-CM controller 333a determines whether or not the abnormality is related to the operation of the SAS expander 307b. In the case where the abnormality is determined to be related to the operation of the SAS expander 307b, the other-CM controller 333*a* makes the CM 300*b* transition to the power-supply state "P_State1", so that only the straight path not passing through the SAS expander 307*b* is used as the access path from the CM 300*a* to the DEs 210 and 220.

On the other hand, in the case where the abnormality is determined not to be related to the operation of the SAS expander 307*b*, the other-CM controller 333*a* makes the CM 300*b* transition to the power-supply state "P_State2". When the CM 300*b* is in the power-supply state "P_State2", access from the I/O access controller 331*b* in the CM 300*b* to the DEs 210 and 220 becomes incapable, and the access path from the SAS expander 307*b* in the CM 300*b* to the DEs 210 and 220 remains usable. Therefore, the I/O access controller 331*a* in the CM 300*a* can use as the access path to the DEs 210 and 220 the cross path passing through the SAS expander 307*b* as well as the straight path. That is, even in the case where an abnormality occurs in the CM 300*b*, the access path from the I/O access controller 331*a* in the CM 300*a* to the DEs 210 and 220 remains redundant as long as the SAS expander 307*b* in the CM 300*b* is normally operating, so that the reliability of the access to the DEs 210 and 220 is maintained.

Further, in the processing of FIG. 10, after an abnormality occurs in the CM 300*b* and the power-supply state of the CM 300*b* transitions to "P_State1" or "P_State2", in step S36 or S43, the CM 300*b* is restarted and processing for making an attempt to restore the entire CM 300*b* to the normal operational state is performed. In this processing, in the case where the abnormality occurring in the CM 300*b* is not related to the operation of the SAS expander 307*b*, in step S36, the CM 300*b* transitions to the power-supply state "P_State3" and the CM 300*b* restarts while the operation of the SAS expander 307*b* is normally continued. Since the CM 300*b* restarts as above, in the case where an abnormality occurring in the CM 300*b* is not related to the operation of the SAS expander 307*b*, it is possible to restore the CM 300*b* to the normal operational state while maintaining the redundancy of the access path from the CM 300*a* to the DEs 210 and 220.

In the processing of FIG. 10, the operations in steps S36 to S39 and S43 to S46 are not necessarily performed. For example, it is sufficient to perform the operations in steps S36 to S39 and S43 to S46 in the case where the CM 300*a* is configured in advance to restart the CM 300*b* when the CM 300*a* detects occurrence of an abnormality in the CM 300*b*.

Further, the SAS expanders 307*a* and 307*b* may have a function of detecting occurrence of an abnormality in the In/Out controllers (IOC) in the CMs containing the SAS expanders 307*a* and 307*b*, respectively. In this case, for example, the SAS expander in each of the CMs 300*a* and 300*b* may notify the other of the CMs 300*a* and 300*b* of occurrence of an abnormality through the cross path.

2.6.7 Processing by SAS Expander on Detection of Abnormality

Each of the SAS expanders 307*a* and 307*b* having the function explained above may contain a memory in which power-supply-state discrimination information is stored, where the power-supply-state discrimination information indicates whether the power-supply state of the CM to which the SAS expander belongs is "P_State3" or "P_State2". (As mentioned before, the power-supply state "P_State3" is the normal operational state, and the CPU and the IOC in each CM are not in operation in the power-supply state "P_State2".) In this case, when one of the CMs transitions to the power-supply state "P_State3" or "P_State2" under control of the other-CM controller in the other of the CMs, the SAS expander in the one of the CMs may receive from the other-CM controller in the other of the CMs a notification indicating the power-supply state to which the one of the CMs transitions, and update the power-supply-state discrimination information stored in the memory contained in the SAS expander.

For example, in the case where the power-supply state of the CM 300*b* is controlled by the other-CM controller 333*a* in the CM 300*a* as explained with reference to FIG. 10, the SAS expander 307*b* in the CM 300*b* receives from the other-CM controller 333*a* information indicating the power-supply state to which the CM 300*b* transitions, and updates the power-supply-state discrimination information stored in the SAS expander 307*b*. In the sequence of FIG. 10, for example, when the CM 300*b* transitions to the power-supply state "P_State2" in step S34 or S39, the other-CM controller 333*a* in the CM 300*a* notifies the SAS expander 307*b* in the CM 300*b* through the cross path that the CM 300*b* transitions to the power-supply state "P_State2". Then, the SAS expander 307*b* updates the power-supply-state discrimination information stored in the memory in the SAS expander 307*b*, on the basis of the notification from the other-CM controller 333*a*, so that the power-supply-state discrimination information indicates "P_State2". Similarly, when the CM 300*b* transitions to the power-supply state "P_State3" in step S36 or S43, the other-CM controller 333*a* in the CM 300*a* notifies the SAS expander 307*b* in the CM 300*b* through the cross path that the CM 300*b* transitions to the power-supply state "P_State3". Then, the SAS expander 307*b* updates the power-supply-state discrimination information stored in the memory in the SAS expander 307*b*, on the basis of the notification from the other-CM controller 333*a*, so that the power-supply-state discrimination information indicates "P_State3".

Figure 11:
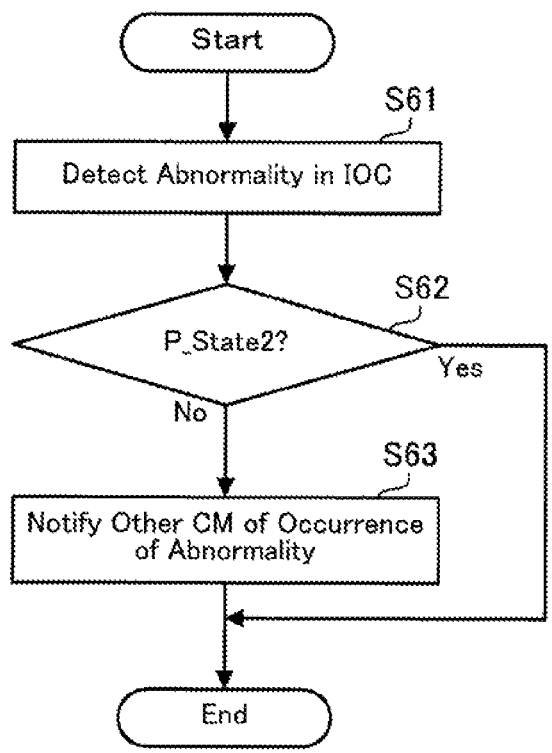
FIG. 11 is a flow diagram indicating a sequence of operations which are performed by an SAS expander in the storage system according to the second embodiment when an abnormality in an In/Out controller (IOC) is detected.

When the SAS expander 307*b* detects an abnormality in the In/Out controllers (IOC) 306*b* while the CM 300*b* is in the power-supply state "P_State2" or "P_State3", the SAS expander 307*b* performs, for example, the processing indicated in FIG. 11. FIG. 11 is a flow diagram indicating a sequence of operations which are performed by the SAS expander 307*b* when an abnormality in the IOC 306*b* is detected.

<Step S61> The SAS expander 307*b* detects an abnormality in the IOC 306*b*.

<Step S62> The SAS expander 307*b* determines, on the basis of the power-supply-state discrimination information stored in the memory in the SAS expander 307*b*, whether or not the CM 300*b* is in the power-supply state "P_State2". When the power-supply state of the CM 300*b* is determined to be "P_State2" (i.e., yes is determined in step S62), the SAS expander 307*b* completes the processing of FIG. 11. When the power-supply state of the CM 300*b* is determined to be "P_State3" (i.e., no (not to be "P_State2") is determined in step S62), the SAS expander 307*b* performs the operation in step S63.

<Step S63> The SAS expander 307*b* notifies the other-CM controller 333*a* through the cross path that the abnormality occurs in the CM 300*b*. The notification of the occurrence of the abnormality issued from the SAS expander 307*b* in step S63 may be utilized when the other-CM controller 333*a* detects the occurrence of the abnormality in the CM 300*b* in step S31 in FIG. 10.

According to the processing of FIG. 11, in the case where the CM 300*b* is in the power-supply state "P_State2" when the SAS expander 307*b* detects an abnormality in the IOC 306*b*, the SAS expander 307*b* determines that the occurrence of the abnormality is anticipated by the CM 300*a*, and does not notify the other-CM controller 333*a* of the occurrence of the abnormality. Therefore, the operation for accessing the DEs 210 and 220 from the CM 300a through the cross path passing through the SAS expander 307b is continued.

2.7 Detachment of CM from Chassis

A sequence of pre-maintenance operations for detaching from a chassis of the storage system 100 a controller module (CM) in which an abnormality occurs is explained below. Although the SAS expander in the CM in the power-supply state "P_State2" remains usable, the CM in the power-supply state "P_State2" has an abnormality. As indicated in steps S36 to S38 in FIG. 10, in the case where the restarting operation for restoring the CM from the power-supply state "P_State2" to "P_State3" is successfully performed, the restarted CM remains usable. However, in the case where the restarting operation fails, the CM remains in the power-supply state "P_State2", so that replacement or repair of the CM is eventually needed.

While the CM is in the power-supply state "P_State2", the SAS expander in the CM is used on some occasions by the other CM in an access path to the DEs 210 and 220. If the CM in the power-supply state "P_State2" is detached from the chassis of the storage system 100, processing performed by the other CM for access to the DEs 210 and 220 can be harmfully affected. Therefore, it is undesirable to detach the CM from the chassis of the storage system 100 when the CM is in the power-supply state "P_State2". Thus, it is desirable to perform an operation of making the CM in the power-supply state "P_State2" transition to the power-supply state "P_State1" so that the other CM cannot use the cross path, and thereafter detach the CM in the power-supply state "P_State1" from the chassis of the storage system 100.

Figure 12:
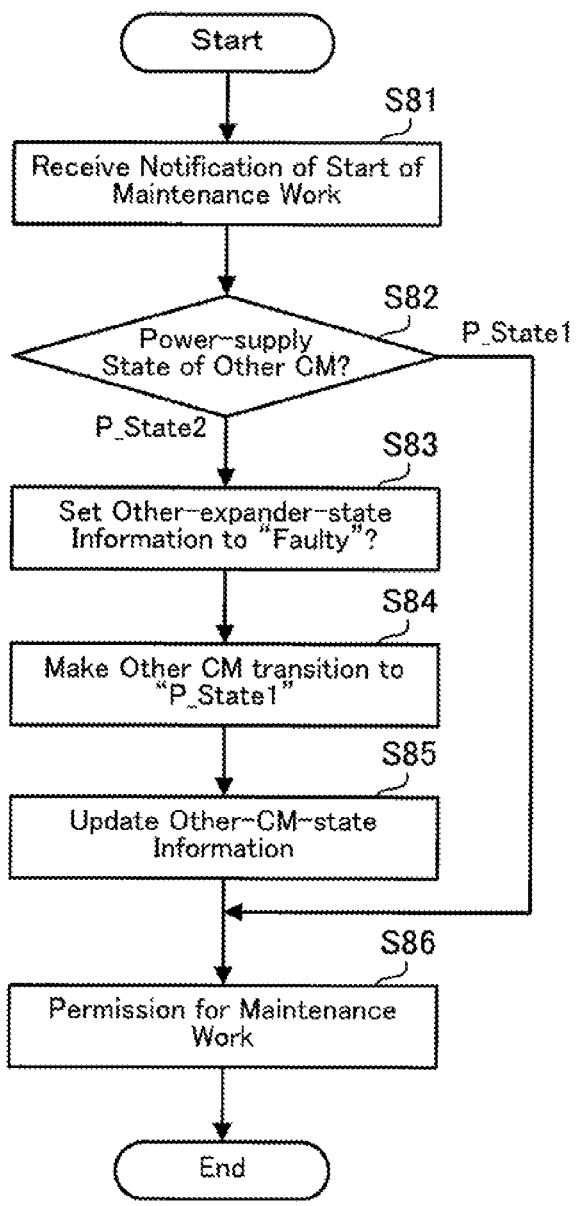
FIG. 12 is a flow diagram indicating a sequence of operations which are performed by one of the CMs in the storage system according to the second embodiment for making the other of the CMs detachable when the other of the CMs is in the power-supply state "P_State2"

According to the present embodiment, before maintenance of a CM in the power-supply state "P_State2" is performed, an operation of making the CM in the power-supply state "P_State2" detachable is performed by the other CM, as indicated in FIG. 12. FIG. 12 is a flow diagram indicating an example of a sequence of operations which are performed by one of the CMs for making the other of the CMs detachable when the other of the CMs is in the power-supply state "P_State2". In FIG. 12, processing performed by the CM 300a in the case where the CM 300b is in the power-supply state "P_State1" or "P_State2" is indicated as an example.

<Step S81> The host apparatus 120 receives a maintenance technician's manipulation for notifying the CM 300a of a start of maintenance work, so that a notification indicating that the CM 300b is to be detached from the chassis of the storage system 100 for maintenance is transmitted to the other-CM controller 333a in the CM 300a. When the other-CM controller 333a in the CM 300a receives the notification from the host apparatus 120, the other-CM controller 333a starts the operations in step S82 and the following steps.

Alternatively, the other-CM controller 333a may start the operations in step S82 and the following steps on detection of an input manipulation of a maintenance switch (not shown) arranged on the chassis of the storage system 100, instead of receipt of the notification of the start of maintenance work from the host apparatus 120. The maintenance switch is provided for notification to one, in the normal operational state "P_State3", of the CMs mounted on the chassis of the storage system 100 that another of the CMs in the power-supply state "P_State1" or "P_State2" is to be detached.

<Step S82> The other-CM controller 333a refers to the other-CM-state information 371a stored in the RAM 302a, and recognizes the power-supply state of the CM 300b. The other-CM controller 333a performs the operation in step S83 when the CM 300b is in the power-supply state "P_State2", and the operation in step S86 when the CM 300b is in the power-supply state "P_State1".

<Step S83> The other-CM controller 333a sets the other-expander-state information 362a stored in the RAM 302a, to "Faulty". Since the I/O access controller 331a refers to the other-expander-state information 362a when the I/O access controller 331a access the DEs 210 and 220, the setting "Faulty" in the other-expander-state information 362a prevents the I/O access controller 331a from using the cross path in the access to the DEs 210 and 220.

<Step S84> The other-CM controller 333a requests the power-supply controller 342a to make the CM 300b transition to the power-supply state "P_State1". When the power-supply controller 342a receives the request, the power-supply controller 342a communicates with the power-supply controller 342b in the CM 300b through the communication path P2, and transmits to the power-supply controller 342b a request to make the CM 300b transition to the "P_State1". When the power-supply controller 342b receives the request from the power-supply controller 342a, the power-supply controller 342b controls the PSU 314b so that the PSU 314b makes the CM 300b transition to the "P_State1".

<Step S85> The other-CM controller 333a updates the other-CM-state information 371a stored in the RAM 302a so as to indicate "P_State1".

<Step S86> The other-CM controller 333a transmits to the host apparatus 120 a notification indicating permission for the maintenance work. Then, the host apparatus 120 indicates the permission for the maintenance work, for example, on the monitor connected to the host apparatus 120.

According to the processing of FIG. 12, in the case where the CM 300b to be subject to the maintenance work is in the power-supply state "P_State2" when the other-CM controller 333a receives the notification of the start of the maintenance work generated by the maintenance technician's manipulation, the other-CM controller 333a forbids the access from the CM 300a to the DEs 210 and 220 through the cross path by setting the other-expander-state information 362a to "Faulty". Thereafter, the other-CM controller 333a makes the CM 300b transition to the power-supply state "P_State1", and notifies the maintenance technician of permission for the maintenance work. Thus, it is possible to prevent an influence of the maintenance work on the operation for accessing from the CM 300a to the DEs 210 and 220 during the maintenance work. For example, it is possible to prevent detection of an error which can be produced if the operation for accessing from the CM 300a to the DEs 210 and 220 is performed through the cross path during the maintenance work.

Further, when the CM 300b transitions to the power-supply state "P_State1" in step S84 in FIG. 12, the operation mode of the LED unit 313b is changed from the blinking mode to the always-on mode. Therefore, the maintenance technician can recognize, with high reliability, the transition of the power-supply state of the CM 300b from "P_State2" to "P_State1" by the change in the operation mode of the LED unit 313b from the blinking mode to the always-on mode.

3. Third Embodiment

The storage system according to the third embodiment is explained below. The third embodiment is different from the second embodiment in the processing for detecting an abnormality which is performed by the I/O access controller 331a or 331b.

The processing for detecting an abnormality according to the second embodiment performed by the I/O access controller 331a or 331b is explained before with reference to FIG. 9. In the processing of FIG. 9, the criterion for determining occurrence of an abnormality in the straight path is identical to the criterion for determining occurrence of an abnormality in the cross path. However, the CM 300b in the power-supply state "P_State2" already has an abnormality. Therefore, it is possible to consider that a further abnormality is more likely to occur in the cross path passing through the SAS expander 307b in the CM 300b when the CM 300b is in the power-supply state "P_State2" than when the CM 300b is in the power-supply state "P_State3".

On the basis of the above consideration, according to the third embodiment, the criterion for determining occurrence of an abnormality in the cross path is stricter when the CM 300b is in the power-supply state "P_State2" than when the CM 300b is in the power-supply state "P_State3". Therefore, according to the third embodiment, occurrence of an abnormality in the cross path can be detected earlier when the CM 300b is in the power-supply state "P_State2" than when the CM 300b is in the power-supply state "P_State3".

Figure 13:
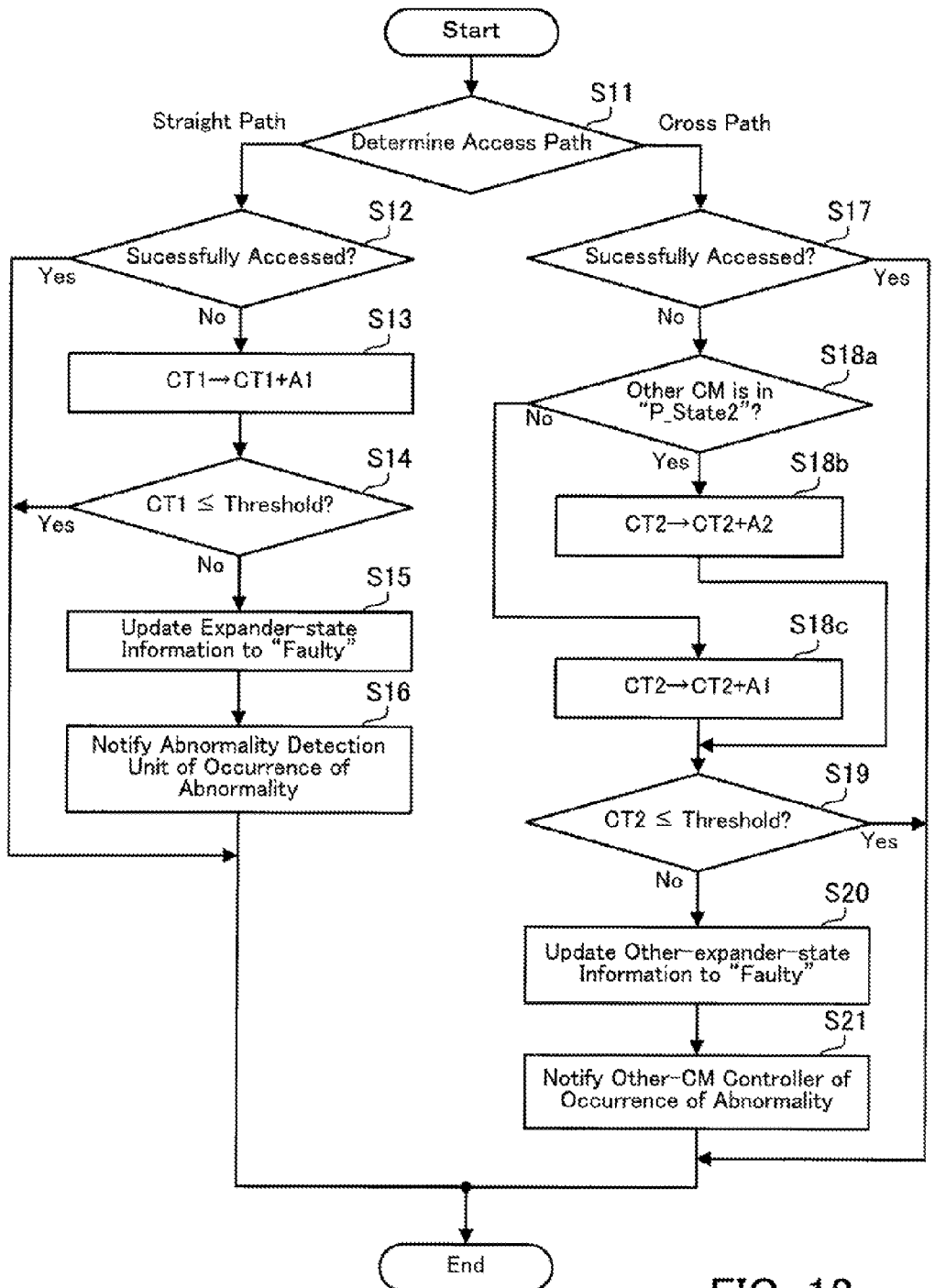
FIG. 13 is a flow diagram indicating a sequence of operations for detecting an abnormality which are performed by an I/O access controller according to a third embodiment.

FIG. 13 is a flow diagram indicating a sequence of operations for detecting an abnormality which are performed by the I/O access controller in one of the CMs according to the third embodiment. Although the following explanations are provided for only the processing performed by the I/O access controller 331a in the CM 300a, the I/O access controller 331b in the CM 300b can also perform similar processing. In addition, the operation in each step in FIG. 13 bearing a step number identical to one of the step numbers in FIG. 9 is the same as the operation in the step bearing the identical step number in FIG. 9, and therefore the explanations on the operations bearing the same step numbers as FIG. 9 are not repeated. Specifically, the sequence of operations in FIG. 13 is different from the sequence of operations in FIG. 9 in that the operation in step S18 in FIG. 9 is replaced with the operations in steps S18a, S18b, and S18c.

<Step S18a> When it is determined in step S17 that the access to the HDDs through the cross path is not normally performed, the I/O access controller 331a refers to the other-CM-state information 371a stored in the RAM 302a, and determines whether or not the CM 300b is in the power-supply state "P_State2". When the CM 300b is determined to be in the power-supply state "P_State2" (i.e., when yes is determined in step S18a), the I/O access controller 331a performs the operation in step S18b. On the other hand, when the CM 300b is determined not to be in the power-supply state "P_State2" (i.e., when no is determined in step S18a), the CM 300b is in the power-supply state "P_State3", and therefore the I/O access controller 331a performs the operation in step S18c.

<Step S18b> The I/O access controller 331a adds a predetermined addend A2 to an abnormality detection count CT2, and updates the abnormality detection count CT2 stored in the RAM 302a in the CM 300a, with the added result. The abnormality detection count CT2 is a count corresponding to the accumulated number of abnormalities detected in the cross path, and stored in the RAM 302a. The added A2 is predetermined to be greater than the predetermined added A1, which is used in steps S13 and S18c in FIG. 13.

<Step S18c> The I/O access controller 331a adds the addend A1 to the abnormality detection count CT2, and updates the abnormality detection count CT2 stored in the RAM 302a, with the added result.

After the operation in step S18b or S18c is performed, the I/O access controller 331a determines in step S19 whether or not the abnormality detection count CT2 is equal to or smaller than a predetermined threshold. When the abnormality detection count CT2 exceeds the predetermined threshold (i.e., when no is determined in step S19), the I/O access controller 331a updates the other-expander-state information 362a to "Faulty" in order to forbid the access to the DEs 210 and 220 through the cross path (in step S20), and notifies the other-CM controller 333a of the occurrence of the abnormality (in step S21).

Since the addend A2 is predetermined to be greater than the addend A1, the abnormality detection count CT2 reaches the predetermined threshold earlier in the case where the CM 300b is in the power-supply state "P_State2" than in the case where the CM 300b is in the power-supply state "P_State3". Therefore, occurrence of an abnormality in the SAS expander 307b in the CM 300b can be detected earlier in the case where the CM 300b is in the power-supply state "P_State2" than in the case where the CM 300b is in the power-supply state "P_State3". For example, it is possible to separate the cross path from the CM 300a and forbid the access to the DEs 210 and 220 through the cross path, before an abnormality which seriously affects the access path from the CM 300a to the DEs 210 and 220 is detected.

Alternatively, it is possible to achieve an effect similar to the processing of FIG. 13 by equalizing the addend A2 (used in step S18b) and the addend A1 (used in step S18c) and varying the predetermined threshold used in step S19 so as to be smaller in the case where the CM 300b is in the power-supply state "P_State2" than in the case where the CM 300b is in the power-supply state "P_State3", instead of setting the addend A2 greater than the addend A1.

4. Fourth Embodiment

The storage system according to the fourth embodiment is explained below.

In the storage system according to the second embodiment, when both of the straight path and the cross path are usable, the I/O access controller in each CM selects the access path to the DEs 210 and 220 so that the communication loads on the straight path and the cross path are balanced as much as possible. For example, the I/O access controller selects the access path so that the usage ratio of each of the straight path and the cross path approaches 50%. However, when the other CM is in the power-supply state "P_State2", the other CM has an abnormality. Therefore, it is possible to consider that an abnormality is more likely to occur in the cross path than in the straight path. Thus, according to the fourth embodiment, in order to reduce the influence of occurrence of an abnormality in the cross path, the usage ratio of the cross path is set lower in the case where the other CM is in the power-supply state "P_State2" than in the case where the other CM is in the power-supply state "P_State3".

Although, in the following explanations on the fourth embodiment, processing performed by the I/O access controller 331a in the CM 300a is taken as an example, the I/O access controller 331b in the CM 300b can also perform similar processing. In addition, in the following explanations, the usage ratio of the straight path or the cross path is the ratio of the number of access operations using the straight path or the cross path. Alternatively, the usage ratio of the straight path or the cross path may be defined as the ratio of the amount of data actually transmitted through the straight path or the cross path. In this case, for example, it is sufficient for the I/O access controller 331a to be informed of the communication loads by the IOC 306a or the SAS expander 307a or 307b, and perform access control so that the ratio of the communication load imposed on each of the straight path and the cross path approaches a predetermined value.

FIGS. 14A and 14B are examples of tables TB1 and TB2 which are referred to when the I/O access controller 331a selects an access path. FIGS. 14A and 14B indicate the usage ratios of the straight path and the cross path in each combination of ranges of the abnormality detection counts CT1 and CT2 which are calculated in the operations for detecting an abnormality performed by the I/O access controller 331a. The I/O access controller 331a refers to the table TB1 of FIG. 14A in the case where the other CM 300b is in the power-supply state "P_State3", and the table TB2 of FIG. 14B in the case where the other CM 300b is in the power-supply state "P_State2". In FIGS. 14A and 14B, for example, the indication "70/30" means that the usage ratio of the straight path by the I/O access controller 331a is 70%, and the usage ratio of the cross path by the I/O access controller 331a is 30%. In the examples of FIGS. 14A and 14B, the thresholds used in step S14 and S19 in FIG. 9 for determining occurrence of an abnormality is assumed to be 255.

According to the fourth embodiment, the I/O access controller 331a refers to the table TB1 or TB2, and uses various values of the usage ratios of the straight path and the cross path according to the combination of the abnormality detection counts CT1 and CT2 stored in the RAM 302a. For example, the tables TB1 and TB2 are stored in the SSD 309a in the CM 300a. Basically, the usage ratio of an access path is lowered when the abnormality detection count for the access path becomes great. Therefore, the frequency of use of the access path through which the number of failures in access operations is relatively small is increased, so that lowering of the probability of success in the access operations can be prevented as much as possible.

Further, in the tables TB1 and TB2 of FIGS. 14A and 14B, the indication "STB" means use of the path as a stand-by path, where the stand-by path is a path which is used only when an access operation through the other path fails. For example, the indication "100/STB" means that the straight path is to be primarily used in an attempt at an access operation, and the cross path is to be used in a reattempt at the access operation only after the attempt using the straight path fails.

The I/O access controller 331a determines the usage ratio of the access path by reference to the table TB1 in the case where the other CM 300b is in the power-supply state "P_State3". In the table TB1, the usage ratios are set so that the straight path and the cross path are equally used (i.e., the usage ratios of the straight path and the cross path are set to 50%) in the case where both of the abnormality detection counts CT1 and CT2 are in identical value ranges. In addition, the usage ratios of the straight path are set lower than the usage ratios of the cross path in the case where the abnormality detection counts CT1 and CT2 are in different value ranges and the abnormality detection count CT1 is greater than the abnormality detection count CT2, and the usage ratios of the cross path are set lower than the usage ratios of the straight path in the case where the abnormality detection counts CT1 and CT2 are in different value ranges and the abnormality detection count CT2 is greater than the abnormality detection count CT1.

On the other hand, the I/O access controller 331a determines the usage ratio of the access path by reference to the table TB2 in the case where the other CM 300b is in the power-supply state "P_State2". On the whole, the usage ratios of the cross path are set lower in the table TB2 than in the table TB1. For example, in the table TB2, the usage ratio of the straight path is set to 60% and the usage ratio of the cross path is set to 40% even in the case where both of the abnormality detection counts CT1 and CT2 are in identical value ranges. Since the usage ratios of the cross path, in which the possibility of occurrence of an abnormality is considered to be relatively high, are lowered as above, it is possible to prevent, on the whole, lowering of the probability of success in access operations as much as possible.

Figure 15:
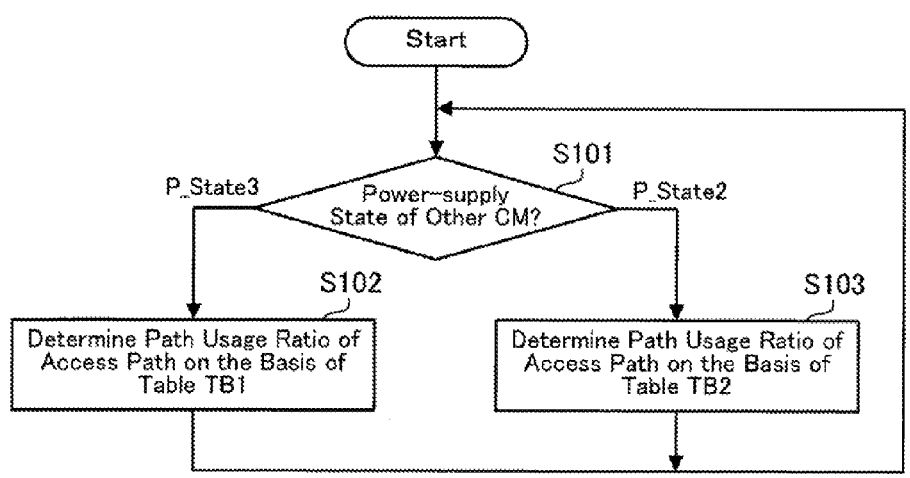
FIG. 15 is a flow diagram indicating a sequence of operations which are performed by the I/O access controller for determining the usage ratio of an access path according to the fourth embodiment.

FIG. 15 is a flow diagram indicating a sequence of operations which are performed by the I/O access controller 331a for determining the usage ratio of the access path. The processing of FIG. 15 is performed in the condition in which both of the expander-state information 361a and the other-expander-state information 362a (which are stored in the RAM 302a) indicate "Normal" and both of the straight path and the cross path are usable.

<Step S101> The I/O access controller 331a determines the power-supply state of the other CM 300b on the basis of the other-CM-state information 371a stored in the RAM 302a. Then, the I/O access controller 331a performs the operation in step S102 when the CM 300b is in the power-supply state "P_State3", and performs the operation in step S103 when the CM 300b is in the power-supply state "P_State2".

<Step S102> In the case where CM 300b is in the power-supply state "P_State3", the I/O access controller 331a determines the usage ratio of the access path on the basis of the table TB1, and thereafter performs the operation in step S101.

<Step S103> In the case where CM 300b is in the power-supply state "P_State2", the I/O access controller 331a determines the usage ratio of the access path on the basis of the table TB2, and thereafter performs the operation in step S101.

The processing of FIG. 15 may be performed at regular time intervals. Alternatively, the processing of FIG. 15 may be performed when the power-supply state of the CM 300b changes and the value of the other-CM-state information 371a is updated.

According to the processing of FIG. 15, the frequency of use of the straight path is increased since the probability of success in the operation for accessing the DEs 210 and 220 is considered to be lower in the case where the CM 300b is in the power-supply state "P_State2" than in the case where the CM 300b is in the power-supply state "P_State3". Therefore, it is possible to suppress, on the whole, lowering of the probability of success in the operations for accessing the DEs 210 and 220.

Further, in the case where the table TB1 as explained above is arranged in the storage system according to the third embodiment, the I/O access controller in each CM may determine the usage ratio of the access path on the basis of the table TB1 regardless of whether the power-supply state of the other CM is "P_State2" or "P_State3". For example, in the case where the processing of FIG. 13 is performed, the addend A2 by which the abnormality detection count CT2 is incremented in step S18b when the other CM is in the power-supply state "P_State2" is greater than the addend A1 by which the abnormality detection count CT2 is incremented in step S18b when the other CM is in the power-supply state "P_State3" and the abnormality detection count CT1 is incremented in step S14 when the straight path is used. Therefore, the abnormality detection count CT2 increases earlier than the abnormality detection count CT1 when the other CM is in the power-supply state "P_State2", and also increases earlier when the other CM is in the power-supply state "P_State2" than when the other CM is in the power-supply state "P_State3". Thus, in the case where the processing of FIG. 13 is performed and the I/O access controller determines the usage ratio of the access path on the basis of only the table TB1, when the other CM is in the power-supply state "P_State2", the frequency of use of the straight path eventually becomes higher than the frequency of use of the cross path. That is, in the above case, the third embodiment in which the processing of FIG. 13 is performed can achieve a similar effect to the fourth embodiment.

5. Fifth Embodiment

The storage system according to the fifth embodiment is explained below. In comparison with the fourth embodiment, the I/O access controller in each CM in the storage system according to the fifth embodiment positively uses the straight path when the other CM is in the power-supply state "P_State2", and the usage ratio of the cross path is greatly reduced. Therefore, it is possible to suppress lowering of the probability of success in the operations for accessing the DEs 210 and 220.

Figure 16:
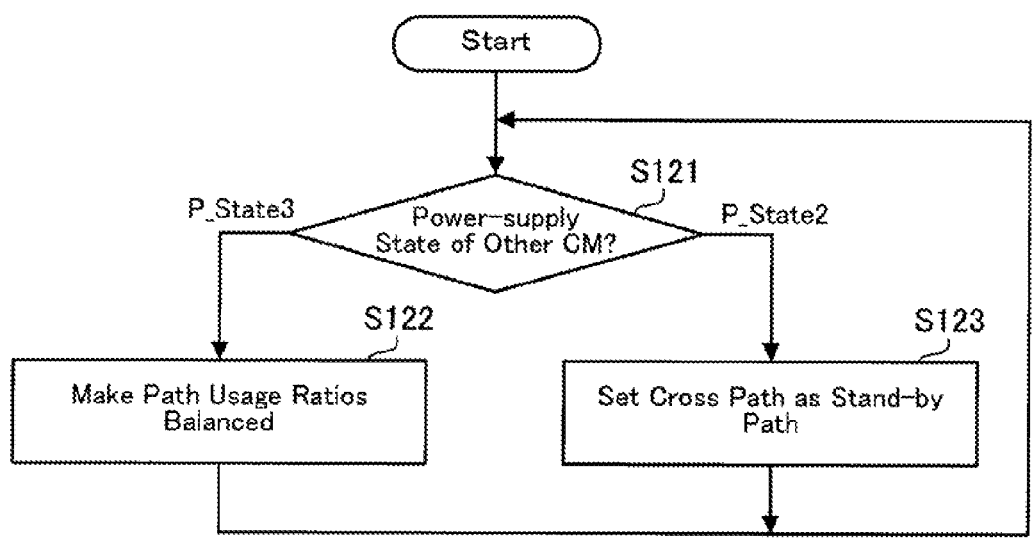
FIG. 16 is a flow diagram indicating a sequence of operations which are performed by an I/O access controller for determining the usage ratio of an access path according to a fifth embodiment.

FIG. 16 is a flow diagram indicating a sequence of operations which are performed by the I/O access controller for determining the usage ratio of the access path according to the fifth embodiment. Although, in the following explanations on the fifth embodiment, processing performed by the I/O access controller 331a in the CM 300a is taken as an example, the I/O access controller 331b in the CM 300b can also perform similar processing. The processing of FIG. 16 can be performed by the I/O access controller 331a in either of the second and third embodiments.

<Step S121> The I/O access controller 331a determines the power-supply state of the other CM 300b on the basis of the other-CM-state information 371a stored in the RAM 302a. Then, the I/O access controller 331a performs the operation in step S122 when the CM 300b is in the power-supply state "P_State3", and performs the operation in step S123 when the CM 300b is in the power-supply state "P_State2".

<Step S122> In the case where CM 300b is in the power-supply state "P_State3", the I/O access controller 331a uses the straight path and the cross path so that the usage ratios of the straight path and the cross path are balanced as much as possible (e.g., the usage ratios of the straight path and the cross path approach 50%). Thereafter, the I/O access controller 331a performs the operations in step S121.

<Step S123> In the case where CM 300b is in the power-supply state "P_State2", the I/O access controller 331a sets the cross path as a stand-by path. Only when the access operation using the straight path fails, the I/O access controller 331a uses the cross path for the access operation. Thereafter, the I/O access controller 331a performs the operation in step S121.

The processing of FIG. 16 may be performed at regular time intervals. Alternatively, the processing of FIG. 16 may be performed when the power-supply state of the CM 300b changes and the value of the other-CM-state information 371a is updated.

According to the processing of FIG. 16, the frequency of use of the straight path is increased since the probability of success in the operation for accessing the DEs 210 and 220 is considered to be lower in the case where the CM 300b is in the power-supply state "P_State2" than in the case where the CM 300b is in the power-supply state "P_State3". Therefore, it is possible to suppress, on the whole, lowering of the probability of success in the operations for accessing the DEs 210 and 220.

6. Sixth Embodiment

6.1 Construction of Storage System

Figure 17:
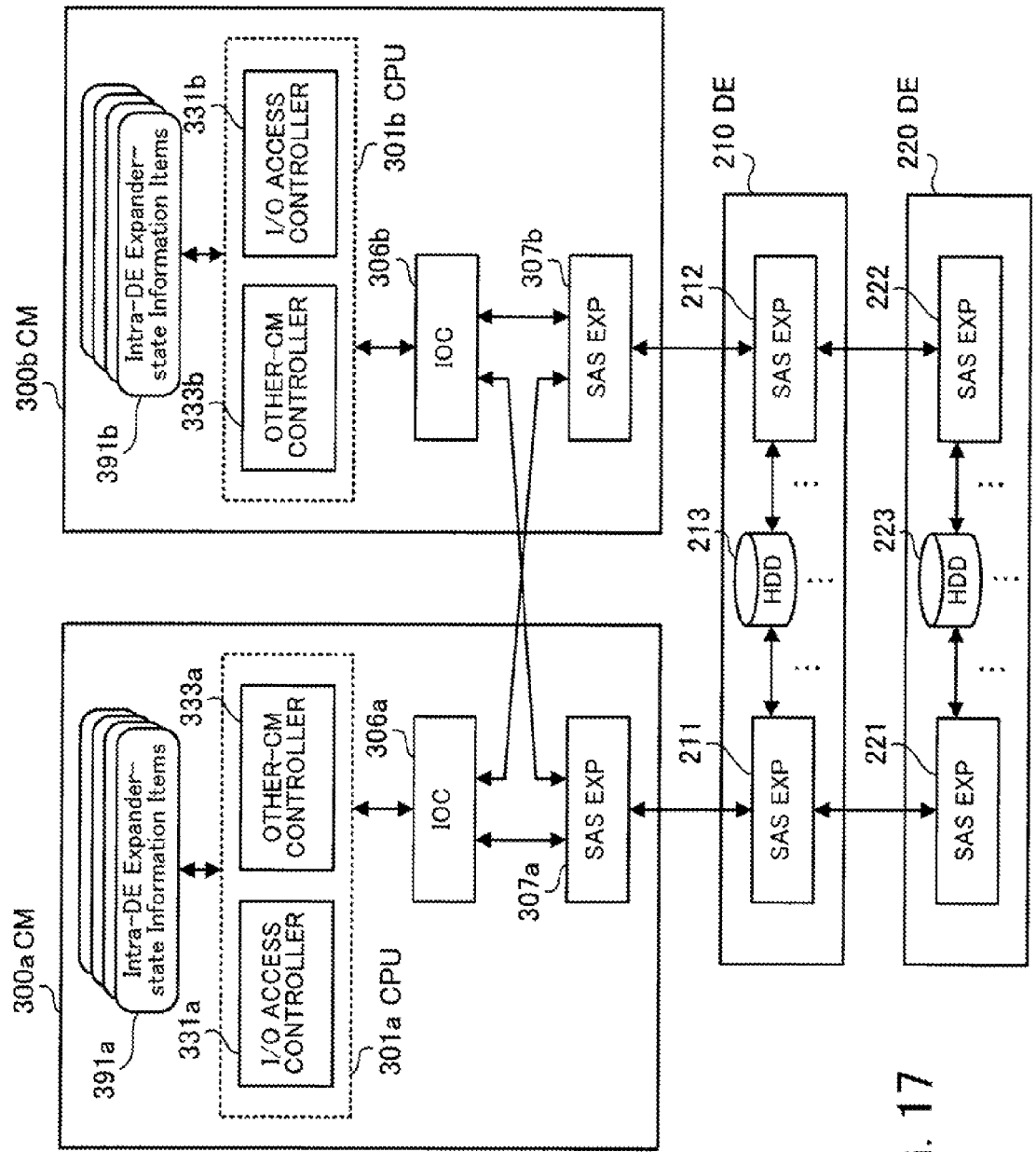
FIG. 17 illustrates an example of a construction of a storage system according to a sixth embodiment.

FIG. 17 illustrates a construction of a storage system according to the sixth embodiment. The DEs 210 and 220 can be connected to each other and to the CMs 300a and 300b as illustrated in FIG. 17. In the construction of FIG. 17, the DE 210 comprises two SAS expanders 211 and 212 and a plurality of HDDs 213, and the DE 220 comprises two SAS expanders 221 and 222 and a plurality of HDDs 223.

The SAS expander 211 in the DE 210 relays data transmission between the SAS expander 307a in the CM 300a and the HDDs 213 in the DE 210, and the SAS expander 212 in the DE 210 relays data transmission between the SAS expander 307b in the CM 300b and the HDDs 213 in the DE 210. Therefore, the CPU 301a in the CM 300a and the CPU 301b in the CM 300b can access the HDDs 213 in the DE 210 through either of the path passing through the SAS expanders 307a and 211 and the path passing through the SAS expanders 307b and 212.

In addition, the SAS expander 211 in the DE 210 relays data transmission between the SAS expander 307a in the CM 300a and the SAS expander 221 in the DE 220, and the SAS expander 212 in the DE 210 relays data transmission between the SAS expander 307b in the CM 300b and the SAS expander 222 in the DE 220. Further, the SAS expander 221 in the DE 220 relays data transmission between the SAS expander 211 in the DE 210 and the HDDs 223 in the DE 220, and the SAS expander 222 in the DE 220 relays data transmission between the SAS expander 212 in the DE 210 and the HDDs 223 in the DE 220. Therefore, the CPU 301a in the CM 300a and the CPU 301b in the CM 300b can access the HDDs 223 in the DE 220 through either of the path passing through the SAS expanders 307a, 211, and 221 and the path passing through the SAS expanders 307b, 212, and 222.

The I/O access controller 331a in the 330a has a function of detecting the operational states of the SAS expanders 211, 212, 221, and 222 in the DEs 210 and 220. When the CM 300a is in the power-supply state "P_State3" (i.e., the normal operational state), the I/O access controller 331a describes the operational states of the SAS expanders 211, 212, 221, and 222 in intra-DE expander-state information items 391a, respectively. The intra-DE expander-state information items 391a are respectively prepared for the SAS expanders 211, 212, 221, and 222, and are stored in the RAM 302a. Each of the intra-DE expander-state information items 391a indicates "Normal", "Faulty", or "Unknown", where "Normal" indicates that the corresponding SAS expander is in operation, "Faulty" indicates that the corresponding SAS expander is not in operation, and "Unknown" indicates that the state of the corresponding SAS expander is unknown.

The other-CM controller 333a in the CM 300a has a function of determining whether to permit detachment of the CM 300b when the other-CM controller 333a receives from the administration terminal 130 a notification of a start of maintenance of the CM 300b while the CM 300b is in the power-supply state "P_State2". Further, the CM 300a can have processing functions which are similar to the functions which the CM 300a has in the second to fifth embodiments.

The CM 300b also has processing functions similar to the CM 300a. For example, the I/O access controller 331b in the CM 300b has a function of detecting the operational states of the SAS expanders 211, 212, 221, and 222 in the DEs 210 and 220. When the CM 300b is in the power-supply state "P_State3" (i.e., the normal operational state), the I/O access controller 331b describes the operational states of the SAS expanders 211, 212, 221, and 222 in intra-DE expander-state information items 391b, respectively. The intra-DE expander-state information items 391b are respectively prepared for the SAS expanders 211, 212, 221, and 222, and are stored in the RAM 302b. Each of the intra-DE expander-state information items 391b indicates "Normal", "Faulty", or "Unknown", where "Normal" indicates that the corresponding SAS expander is in operation, "Faulty" indicates that the corresponding SAS expander is not in operation, and "Unknown" indicates that the state of the corresponding SAS expander is unknown.

The other-CM controller 333b in the CM 300b has a function of determining whether to permit detachment of the CM 300a when the other-CM controller 333b receives from the administration terminal 130 a notification of a start of maintenance of the CM 300a while the CM 300a is in the power-supply state "P_State2".

6.2 Access Paths to DEs

Access paths to the DEs 210 and 220 used in the case where one of the CMs is in the power-supply state "P_State2" are explained below. In the following explanations, the case where the CM 300b is in the power-supply state "P_State2" is taken as an example.

In the construction of FIG. 17, each of the path passing through the SAS expanders 307a and 211 and the path passing through the SAS expanders 307b and 212 exists as an access path from the CM 300a to the HDDs 213. Even when the power-supply state of the CM 300b transitions from "P_State3" to "P_State2", the above two paths remain usable. In addition, even when the CM 300b transitions to the "P_State2", both of the path passing through the SAS expanders 307a, 211, and 221 and the path passing through the SAS expanders 307b, 212, and 222 remain usable as an access path from the CM 300a to the HDDs 223 in the DE 220.

Figure 18:
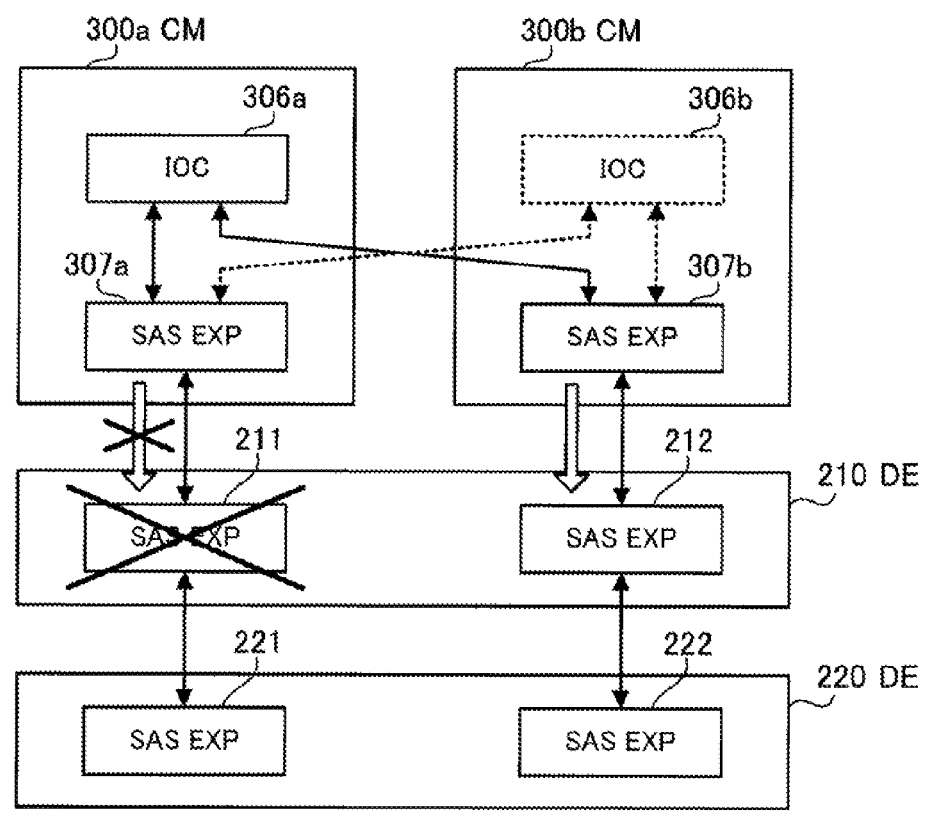
FIG. 18 illustrates a situation of the storage system of FIG. 17 in which an SAS expander in a drive enclosure (DE) is not in operation.

Consider a first exemplary case in which the SAS expander in one of the DEs arranged under the CM 300a is not in operation while the CM 300b is in the power-supply state "P_State2", as illustrated in FIG. 18. FIG. 18 illustrates a situation of the storage system of FIG. 17 in which the SAS expander 211 in the DE 210 is not in operation. The SAS expander 211 is one of the SAS expanders which are arranged under the CM 300a (i.e., which are connected in series with the CM 300a). In this case, although the CM 300a cannot access the HDDs 213 in the DE 210 through the SAS expanders 307a and 211, the CM 300a can access the HDDs 213 in the DE 210 by using the access path passing through the SAS expanders 307b and 212. In addition, although the CM 300a cannot access the HDDs 223 in the DE 220 through the SAS expanders 307a, 211, and 221, the CM 300a can access the HDDs 223 in the DE 220 by using the access path passing through the SAS expanders 307b, 212, and 222. If the CM 300b is detached from the chassis of the storage system in the situation illustrated in FIG. 18, the CM 300a can access neither the HDDs 213 in the DE 210 nor the HDDs 223 in the DE 220. Therefore, it is undesirable to detach the CM 300b in the situation illustrated in FIG. 18.

Further, since the I/O access controller 331a in the CM 300a cannot communicate with the SAS expander 221 in the DE 220 in the situation illustrated in FIG. 18, the I/O access controller 331a cannot determine whether or not the SAS expander 221 is in operation. Therefore, the I/O access controller 331a sets one of the intra-DE expander-state information items 391a corresponding to the SAS expander 221 to "Unknown".

Figure 19:
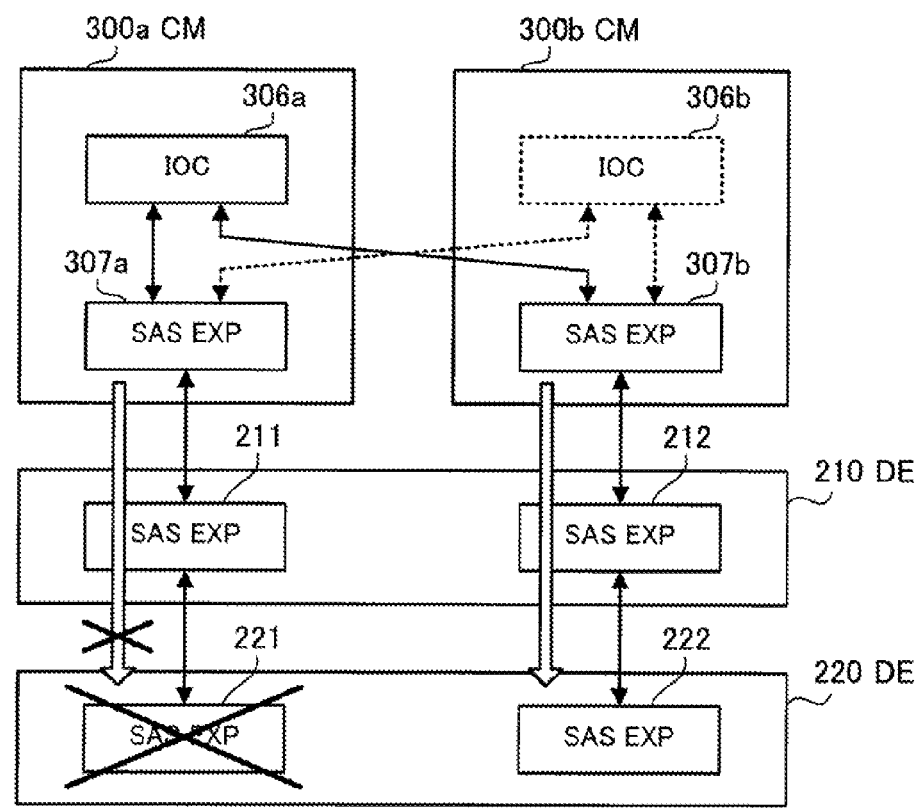
FIG. 19 illustrates a situation of the storage system of FIG. 17 in which an SAS expander in another drive enclosure (DE) is not in operation.

Next, consider a second exemplary case in which another of the SAS expanders in another of the DEs arranged under the CM 300a is not in operation while the CM 300b is in the power-supply state "P_State2", as illustrated in FIG. 19. FIG. 19 illustrates a situation of the storage system of FIG. 17 in which the SAS expander 221 in the DE 220 is not in operation. The SAS expander 221 is one of the SAS expanders which are arranged under the CM 300a. In the situation of FIG. 19, although the CM 300a cannot access the HDDs 223 in the DE 220 through the SAS expanders 307a, 211, and 221, the CM 300a can access the HDDs 223 in the DE 220 by using the access path passing through the SAS expanders 307b, 212, and 222. If the CM 300b is detached from the chassis of the storage system in the situation illustrated in FIG. 19, the CM 300a cannot access the HDDs 223 in the DE 220. Therefore, it is undesirable to detach the CM 300b in the situation illustrated in FIG. 19.

When the other-CM controller 333a receives a request for permission to start maintenance of the CM 300b in the situation illustrated in FIG. 18 or 19, the other-CM controller 333a performs processing for notifying the maintenance technician that detachment of the CM 300b is not permitted. In addition, for example, when the other-CM controller 333a receives a request for permission to start maintenance of the CM 300b in the situation illustrated in FIG. 18, the other-CM controller 333a may perform processing for prompting the maintenance technician to replace the SAS expander 211 in the DE 210 before the CM 300b is detached. Further, for example, when the other-CM controller 333a receives a request for permission to start maintenance of the CM 300b in the situation illustrated in FIG. 19, the other-CM controller 333a may perform processing for prompting the maintenance technician to replace the SAS expander 221 in the DE 220 before the CM 300b is detached.

Figure 20:
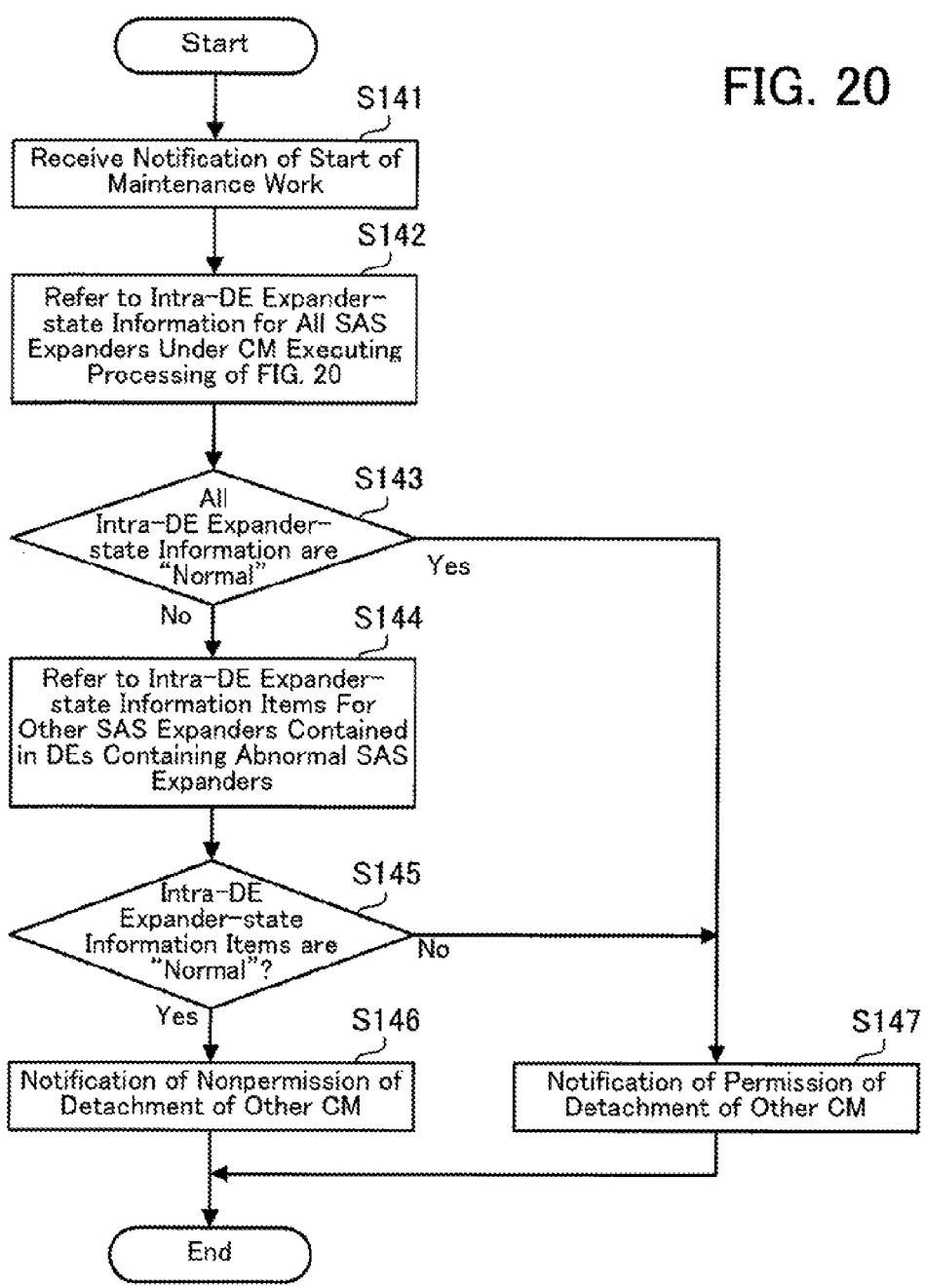
FIG. 20 is a flow diagram indicating a sequence of operations which are performed by an other-CM controller in one of the CMs in the storage system according to the sixth embodiment for determining whether or not the other of the CMs can be detached.

FIG. 20 is a flow diagram indicating a sequence of operations which are performed by the other-CM controller in one of the CMs for determining whether or not the other of the CMs can be detached. In the processing of FIG. 20, the CM 300b is assumed to be in the power-supply state "P_State2".

<Step S141> When the other-CM controller 333a receives from the host apparatus 120 a notification of a start of maintenance work in which the CM 300b is to be detached from the chassis of the storage system 100, the other-CM controller 333a starts the operations in step S142 and the following steps. The operations in step S141 is identical to the operation in step S81.

<Step S142> The other-CM controller 333a refers to ones of the intra-DE expander-state information items 391a corresponding to all the SAS expanders 211 and 221 contained in the DEs 210 and 220 and arranged under the CM 300a (connected in series with the SAS expander 307a in the CM 300a).

<Step S143> The other-CM controller 333a determines whether or not all of the ones of the intra-DE expander-state information items 391a referred to in step S142 indicate "Normal". When all of the ones of the intra-DE expander-state information items 391a referred to in step S142 are determined to indicate "Normal" (i.e., when yes is determined in step S143), all of the SAS expanders 211 and 221 corresponding to the ones of the intra-DE expander-state information items 391a are determined to be in operation, and therefore the other-CM controller 333a performs the operation in step S147. On the other hand, when at least one of the ones of the intra-DE expander-state information items 391a referred to in step S142 is determined to indicate "Faulty" or "Unknown" (i.e., when no is determined in step S143), the other-CM controller 333a performs the operation in step S144.

<Step S144> The other-CM controller 333a recognizes one or more SAS expanders corresponding to the at least one of the intra-DE expander-state information items 391a determined to indicate "Faulty" or "Unknown" in step S143 (i.e., one or more SAS expanders in which an abnormality may possibly exists). Then, the other-CM controller 333a refers to one or more of the intra-DE expander-state information items 391a corresponding to the SAS expanders which are arranged under the CM 300b (i.e., connected in series with the SAS expander 307b) and are respectively contained in one or more of the DEs containing the one or more SAS expanders corresponding to the at least one of the intra-DE expander-state information items 391a determined to indicate "Faulty" or "Unknown" in step S143.

For example, when one of the intra-DE expander-state information items 391a corresponding to the SAS expander 211 is determined to indicate "Faulty" or "Unknown" in step S143, the other-CM controller 333a refers to one of the intra-DE expander-state information items 391a corresponding to the SAS expander 212 arranged in the DE 210 (containing the SAS expander 211), in step S144.

<Step S145> The other-CM controller 333a determines whether or not all of the one or more of the intra-DE expander-state information items 391a corresponding to the one or more SAS expanders arranged under the CM 300b and referred to in step S144 indicate "Normal". When all of the one or more of the intra-DE expander-state information items 391a corresponding to the one or more SAS expanders arranged under the CM 300b and referred to in step S144 are determined to indicate "Normal" (i.e., when yes is determined in step S145), all of the one or more SAS expanders corresponding to the one or more of the intra-DE expander-state information items 391a are determined to be in operation, and therefore the other-CM controller 333a performs the operation in step S146. On the other hand, when at least one of the one or more of the intra-DE expander-state information items 391a referred to in step S144 is determined to indicate "Faulty" or "Unknown" (i.e., when no is determined in step S145), the other-CM controller 333a performs the operation in step S147.

<Step S146> The other-CM controller 333a notifies the host apparatus 120 that detachment of the CM 300b is not permitted. Then, the host apparatus 120 indicates, for example, on a monitor connected to the host apparatus 120, that the detachment of the CM 300b is not permitted.

In addition, the other-CM controller 333a may prompt the maintenance technician, through the monitor connected to the host apparatus 120, to replace, before detachment of the CM 300b, the one or more SAS expanders for which the one or more of the intra-DE expander-state information items 391a are determined to indicate "Faulty" or "Unknown".

The operation in step S146 is performed, for example, in the situation of FIG. 18 or 19. When the processing in step S146 is performed, it is possible to avoid absence of the access path to the DEs 210 and 220, which can be caused by detachment of the CM 300b.

For example, when the other-CM controller 333a receives a request for permission to start maintenance of the CM 300b in the situation illustrated in FIG. 18, the other-CM controller 333a may perform, in step S146, processing for prompting the maintenance technician to replace the SAS expander 211 in the DE 210 before the CM 300b is detached. When the SAS expander 211 in the DE 210 is replaced in the situation of FIG. 18, the access path from the CM 300a through the SAS expanders 307a and the 211 is restored. After the replacement of the SAS expander 211, the CM 300b can be detached and replaced without causing a break in the access path to the HDDs 213 in the DE 210 or the HDDs 223 in the DE 220.

<Step S147> The other-CM controller 333a transmits to the host apparatus 120 a notification of permission to detach the CM 300b. Then, the host apparatus 120 indicates, on the monitor connected to the host apparatus 120, that detachment of the CM 300b is permitted. The operation in step S147 is performed when both of the access path to the HDDs 213 in the DE 210 and the access path to the HDDs 223 in the DE 220 are affected by detachment of the CM 300b, for example, as in the following cases illustrated in FIGS. 21 and 22.

Figure 21:
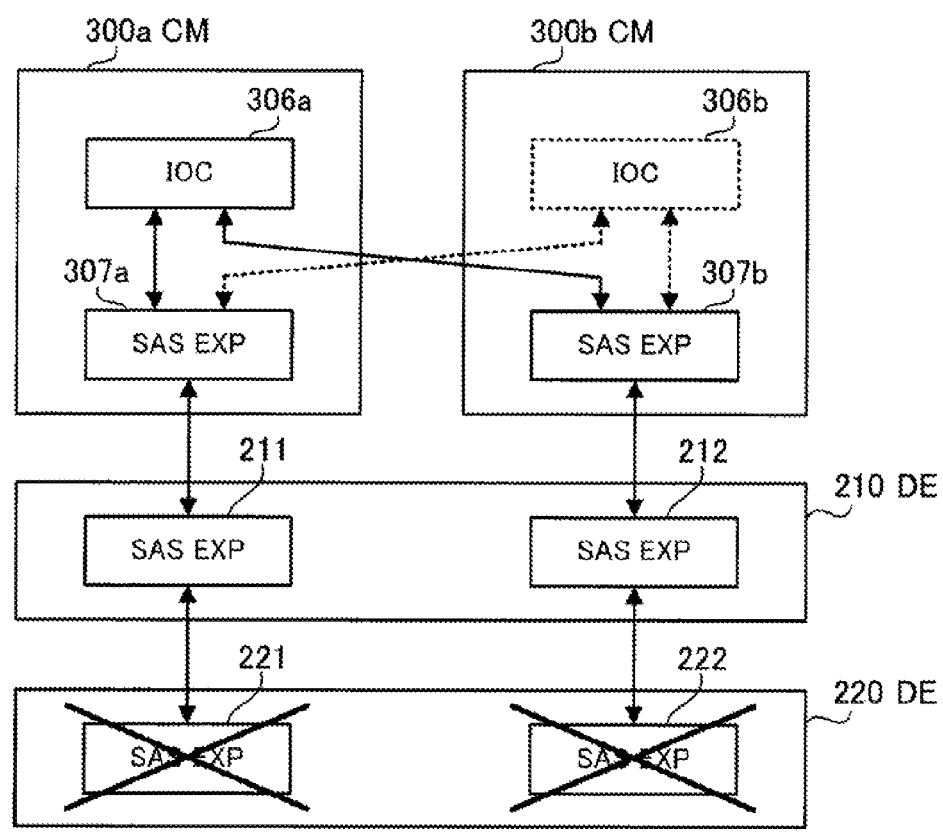
FIG. 21 illustrates a situation of the storage system of FIG. 17 in which SAS expanders in one of the DEs are not in operation.

Further, consider a third exemplary case in which the SAS expanders in one of the DEs arranged under both of the CMs 300a and 300b are not in operation while the CM 300b is in the power-supply state "P_State2", as illustrated in FIG. 21. FIG. 21 illustrates a situation of the storage system of FIG. 17 in which the SAS expanders 221 and 222 in the DE 220 are not in operation.

When the other-CM controller 333a receives a request for permission to start maintenance of the CM 300b in the situation illustrated in FIG. 21, the other-CM controller 333a determines, in step S143 in FIG. 20, that an abnormality may possibly occur in the SAS expander 221 arranged under the CM 300a. However, in step S145 in FIG. 20, the other-CM controller 333a determines that an abnormality may also possibly occur in the SAS expander 222 arranged in the DE 220, in which the SAS expander 221 is also arranged.

The results of the above determination in steps S143 and S145 indicate that both of the SAS expanders 221 and 222 in the DE 220 are not in operation. In this situation, access from the CM 300a to the HDDs 223 in the DE 220 is impossible. Therefore, the other-CM controller 333a transmits to the host apparatus 120 the notification of permission to detach the CM 300b.

Figure 22:
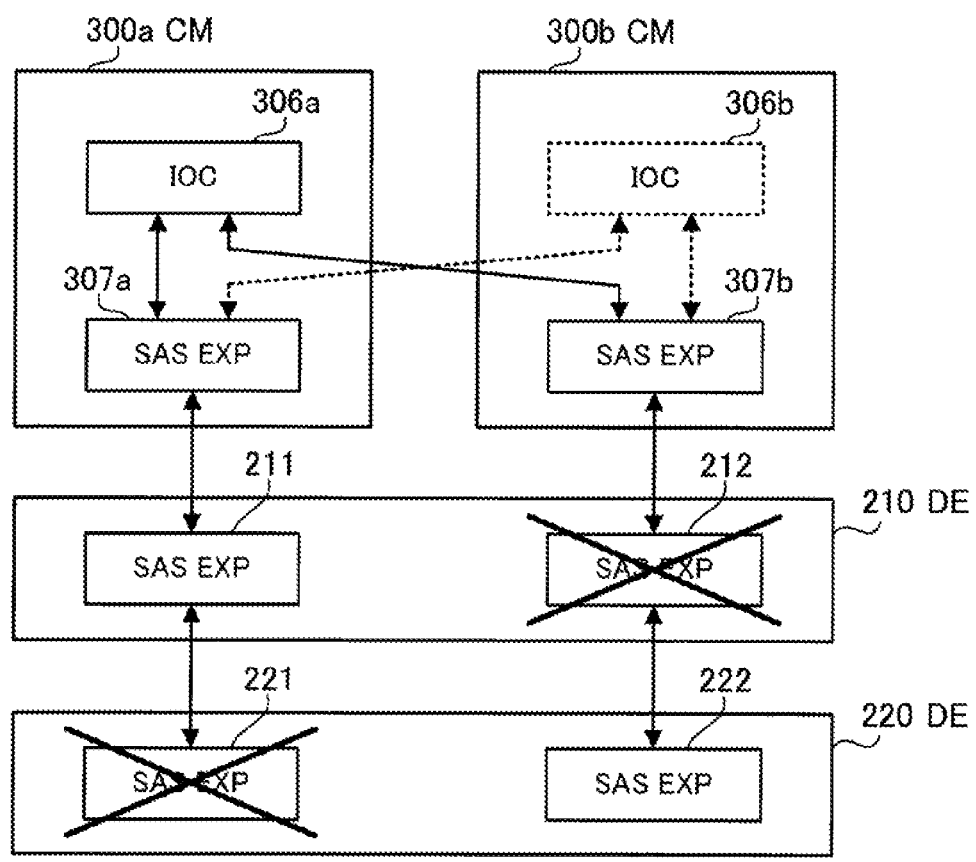
FIG. 22 illustrates a situation of the storage system of FIG. 17 in which an SAS expander in one of the DEs and an SAS expander in the other of the DEs are not in operation.

Furthermore, consider a fourth exemplary case in which the SAS expanders one of which is arranged under the CM 300a in the DE 220 and the other of which is arranged under the CM 300b in the DE 210 are not in operation while the CM 300b is in the power-supply state "P_State2", as illustrated in FIG. 22. FIG. 22 illustrates a situation of the storage system of FIG. 17 in which the SAS expander 221 in the DE 220 and the SAS expander 212 in the DE 210 are not in operation. In the situation of FIG. 22, the I/O access controller 331a in the CM 300a cannot communicate with the SAS expander 222 in the DE 220, and therefore the I/O access controller 331a cannot determine whether or not the SAS expander 222 is in operation. Thus, the I/O access controller 331a sets one of the intra-DE expander-state information items 391a corresponding to the SAS expander 222 to "Unknown".

When the other-CM controller 333a receives a request for permission to start maintenance of the CM 300b in the situation illustrated in FIG. 22, the other-CM controller 333a determines, in step S143 in FIG. 20, that an abnormality may possibly occur in the SAS expander 221 arranged under the CM 300a. However, the other-CM controller 333a determines, in step S145 in FIG. 20, that the other-CM controller 333a cannot communicate with the SAS expander 222 arranged in the DE 220, in which the SAS expander 221 is also arranged.

The results of the above determination in steps S143 and S145 indicate that the CM 300a can communicate with neither of the SAS expanders 221 and 222 in the DE 220. On the other hand, when the CM 300b is detached from the chassis of the storage system, the CM 300a can access the HDDs 213 in the DE 210 through the SAS expander 211. Therefore, the other-CM controller 333a transmits to the host apparatus 120 the notification of permission to detach the CM 300b.

Although the processing performed by the other-CM controller 333a is taken as an example in the above explanations on the sixth embodiment, the other-CM controller 333b in the CM 300b can also perform similar processing when the CM 300a is in the power-supply state "P_State2".

7. Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions and alterations could be made hereto without departing from the spirit and scope of the invention.

What is claimed is:

1. A storage system comprising:
 a storage device which stores data; and
 control units each of which controls an operation for accessing said storage device, each of said control units including:
  a relay unit which relays access to said storage device,
  an access controller which selects one of a first path passing through the relay unit belonging to said control unit and a second path passing through another relay unit belonging to another control unit and accesses said storage device through the selected path when said control unit and said another control unit are in a normal operational state, and
  an operational-state controller which determines whether or not said another relay unit belonging to said another control unit is usable when the operational-state controller detects occurrence of an abnormality in said another control unit, and makes said another control unit transition to a partially-operational state when said another relay unit belonging to said another control unit is determined to be usable,
 wherein when said another control unit is in the partially-operational state, a portion of said another control unit including another access controller is not in operation and the access controller in said control unit continues to select one of the first path and the second path and access said storage device through the selected path.

2. The storage system according to claim 1, wherein, when said another control unit is in the partially-operational state, said access controller lowers a frequency of operations for access to said storage device through said another relay unit in said another control unit than the frequency of operations for access of when said another control unit is in a normal operational state,
 wherein when said another control unit is in the normal operational state, both of said another relay unit and another access controller in said another control unit are normally operating.

3. The storage system according to claim 1, wherein each of said control units further includes an abnormality-count storing unit which stores a count corresponding to an accumulated number of detected abnormalities for each of the relay units relaying the access, and when said access controller detects an abnormality in an attempt to access said storage device, the access controller increments the count for the relay unit through which said attempt to access is made, and reduces a frequency of use of the relay unit for accessing said storage device in correspondence with an increase in said count of the relay unit.

4. The storage system according to claim 3, wherein the access controller increments said count for the relay unit in a first control unit by a first addend when said access controller detects an abnormality in an attempt to access said storage device through the relay unit and the first control unit is in the normal operational state, and increments said count for the relay unit in a second control unit by a second addend when said access controller detects an abnormality in an attempt to access said storage device through the relay unit and the second control unit is in a partially-operational state, wherein the second addend is greater than the first addend.

5. The storage system according to claim 2, wherein said access controller makes an attempt to access the storage device through the relay unit in one of the control units which is in a partially-operational state, after said access controller fails in an attempt to access said storage device through the relay unit in another of the control units which is in the normal operational state.

6. The storage system according to claim 1, wherein said access controller determines the relay unit for use in access to said storage device, on the basis of a history of detection of abnormality in previous operations for access to the storage device through the relay unit.

7. The storage system according to claim 1, wherein said access controller forbids access to said storage device through said another relay unit in said another control unit according to information on detection of an abnormality in an attempt to access the storage device through said another relay unit in said another control unit, on the basis of a first criterion when said another control unit is in a normal operational state, and on the basis of a second criterion when said another control unit is in said partially-operational state, wherein the second criterion is stricter than the first criterion.

8. The storage system according to claim 7, wherein each of said control units further includes a storage medium which stores a count corresponding to an accumulated number of abnormalities detected in an attempt to access the storage device through said another relay unit in said another control unit, and
 the access controller increments the count by a first addend when said access controller detects an abnormality in an attempt to access said storage device through said another relay unit in said another control unit and said another control unit is in the normal operational state, and increments the count by a second addend when said access controller detects an abnormality in an attempt to access said storage device through said another relay unit in said another control unit and said another control unit is in the partially-operational state, wherein the second addend is greater than the first addend.

9. The storage system according to claim 1, wherein said storage device includes a data storage and intra-storage relay units, the intra-storage relay units are respectively connected one-to-one with the relay units in said control units, and each of the intra-storage relay units relays access to the data storage from the connected relay unit, and
 each of said control units further includes a decision unit that makes a decision not to permit detachment of said another control unit when the decision unit receives a request for permission to detach said another control unit while said another control unit is in the partially-operational state, and the intra-storage relay unit connected to own relay unit is not in operation, and another intra-storage relay unit connected to said another relay unit in said another control unit is in operation.

10. The storage system according to claim 1, wherein each of said control units further includes a condition indicator which indicates power-supply states of the control unit, the power-supply states include a partially-operational state and an abnormal state, and the abnormal state is a state in which an abnormality occurs in said control unit and which is different from the partially-operational state.

11. The storage system according to claim 1, wherein each of said control units stops power supply to said access controller when said control unit transitions to the partially-operational state.

12. The storage system according to claim 1, wherein said operational-state controller determines whether or not said another relay unit belonging to said another control unit is usable when the operational-state controller detects occurrence of an abnormality in said another control unit, and makes said another control unit transition to an inoperable state when said another relay unit belonging to said another control unit is determined to be not usable, wherein the inoperable state is a state in which a portion of said another control unit including at least said another access controller and said another relay unit is not in operation.

13. A control apparatus for controlling an operation for access to a storage device which stores data, the control apparatus comprising:
    a relay unit which relays access to said storage device;
    an access controller which selects one of a first path passing through the relay unit belonging to said control apparatus and a second path passing through another relay unit belonging to another control apparatus and accesses said storage device through the selected path when said control apparatus and said another control apparatus are in a normal operational state; and
    an operational-state controller which determines whether or not said another relay unit belonging to said another control apparatus is usable when the operational-state controller detects occurrence of an abnormality in said another control apparatus, and makes said another control apparatus transition to a partially-operational state when said another relay unit belonging to said another control apparatus is determined to be usable,
    wherein, when said another control apparatus is in the partially-operational state, a portion of said another control apparatus including an access controller is not in operation and the access controller belonging to the control apparatus continues to select one of the first path and the second path and access said storage device through the selected path.

14. A control method performed in a storage system which includes a storage device storing data and a plurality of control units each of which controls an operation for access to the storage device, where each of the plurality of control units includes a relay unit, an access controller, and an operational-state controller, said control method comprising:
    selecting, by said access controller, one of a first path passing through the relay unit in said control unit and a second path passing through another relay unit belonging to another control unit and accessing said storage device through the selected path when said control unit and said another control unit are in a normal operational state;
    determining, by said operational-state controller in the control unit, whether or not said another relay unit belonging to said another control unit is usable when the operational-state controller in the control unit detects occurrence of an abnormality in said another control unit; and
    making, by the operational-state controller, said another control unit transition to a partially-operational state when said another relay unit belonging to said another control unit is determined to be usable,
    wherein, when said another control unit is in the partially-operational state, a portion of said another control unit including another access controller is not in operation and the access controller belonging to the control unit continues to select one of the first path and the second path and access said storage device through the selected path.

\* \* \* \* \*